July 12, 1960  F. SANDGREN ET AL  2,944,644
MULTI-UNIT PRINTING-PRESS DRIVE
Filed June 4, 1956  10 Sheets-Sheet 5

LEGEND—
— SYSTEM SELECTION INFORMATION
— SYSTEM CONTROL INFORMATION
⇒ LINE POWER

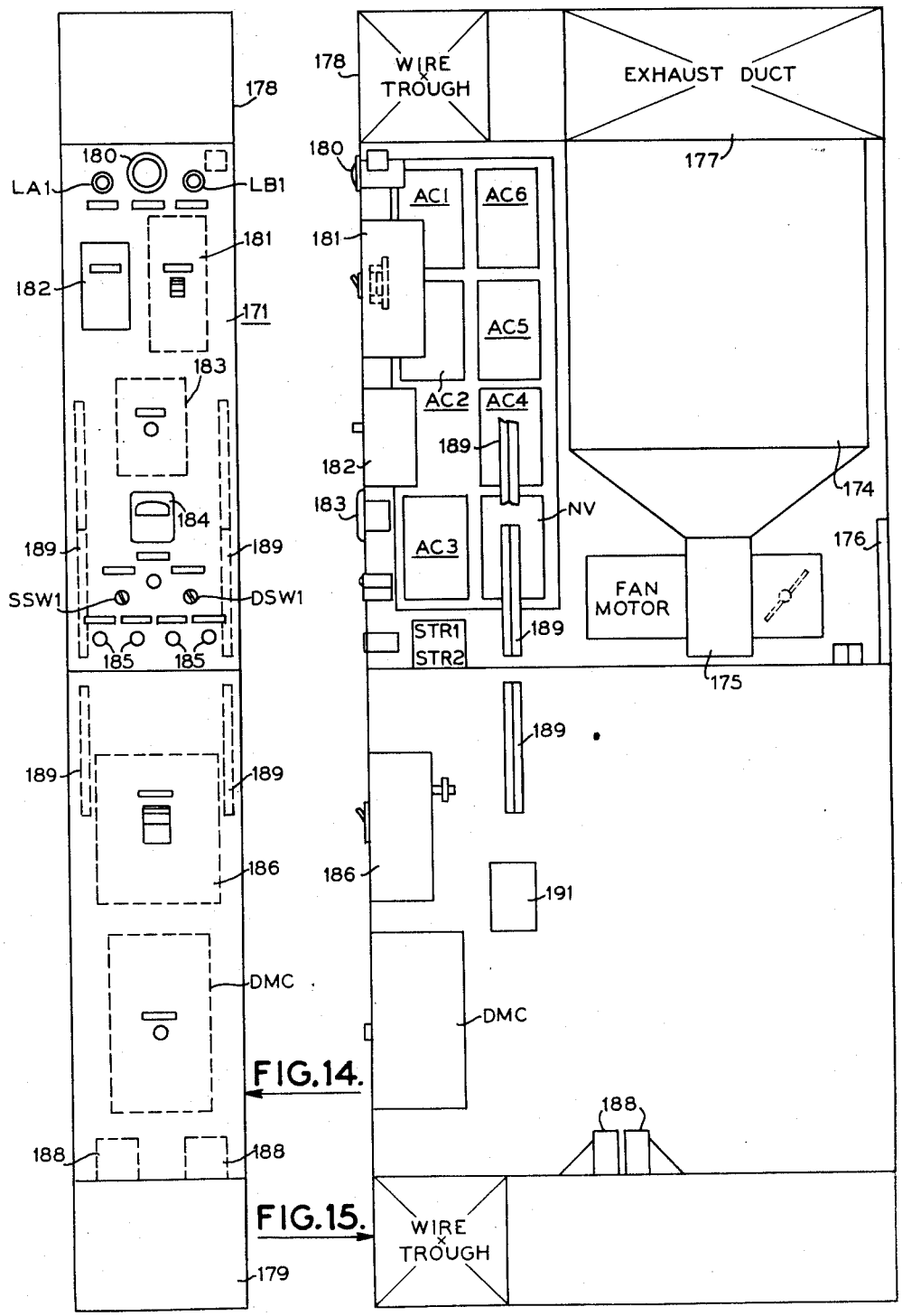

United States Patent Office 2,944,644
Patented July 12, 1960

2,944,644
MULTI-UNIT PRINTING-PRESS DRIVE

Find Sandgren and Terrence Gizeski, Chicago, Ill., assignors, by mesne assignments, to Electric Eye Equipment Company, Danville, Ill., a corporation of Delaware Filed June 4, 1956, Ser. No. 589,150

29 Claims. (Cl. 192—.02)

Our invention relates generally to systems for controlling a multiplicity of electric drive motors in a selected number or grouping to run at simultaneously and coordinately controllable speeds of all the motors that are pre-selected to cooperate within a single group. In a more particular aspect, our invention concerns itself with electric drive systems for multi-unit printing presses, for instance in newspaper and magazine printing plants.

In such plants, according to the unit drive system, each of the individual printing press units and folder units has its own drive motor, and the main drive shafts, or preferably the motor shafts themselves, are all aligned and are provided with clutch mechanisms that permit a mechanical connection between at least one folder drive and a selected number or group of press unit drives to mechanically secure synchronism of all press units cooperating with the folder upon a single web of paper. The number of press units thus cooperatively joined with a folder, or the number of folders thus placed into coaction, depends upon the number of pages to be printed and to be cut and folded into a complete copy of the issue to be produced.

The drive motors for the respective folder units and press units are preferably alternating-current induction motors of the wound-rotor type. It is known in such systems to simultaneously and coordinately control the selected group of cooperating motors by switching more or less resistance in graduated steps into and out of the external rotor circuit; and our invention, more specifically, relates to alternating-current systems of this particular type.

In some of the known systems, complicated cam mechanisms are required for sequentially switching the resistors in the secondary circuit of each individual unit drive motor and aside from the above-mentioned clutches for mechanically joining the shafts of these motors, another group of mechanical clutch mechanisms is needed for joining, synchronizing and phase-positioning the sequence-cam mechanisms. Such intricate mechanisms are susceptible to trouble and require much space and attendance. In such and other known systems it is further necessary to selectively and manually operate a number of power switches, usually knife blade switches, for electrically selecting and joining the unit drive motors, these switches being distributed over various locations in the plant. In all these systems, the initial cost is often prohibitive to provide for built-in flexibility as regards subsequent modification or supplementation of a plant, and each individual installation requires a major amount of special field and plant engineering.

Our invention, therefore, has for its general objects (1) to improve the multi-unit drive systems toward greater flexibility than heretofore available as regards readily applicable variety in system build-up and subsequent growth or modification of a printing plant, (2) to facilitate and simplify the selective control of the system set-up from any desired or most convenient location, such as from the superintendent's room or other central location or vantage point of the plant, (3) to reduce and simplify the setting-up operations and maintenance requirements, and (4) to reduce the work and time needed for repair or exchange even of major system components.

These and more specific objects and advantages as well as the means for achieving them, said means being set forth with particularity in the claims annexed hereto, will be apparent from, and will be set forth in the following description of, the embodiments presented by way of example on the accompanying drawings which relate to a single printing-press plant with the exception of Fig. 11 which shows modifications alternatively applicable in the plant. More specifically:

Figs. 1 to 5, in totality, show a schematic circuit diagram of the plant. These illustrations are to be placed together to form a continuous series commencing with Fig. 1 on the left.

Fig. 14 is a front view of the cubicle; and Fig. 15 is a schematic, composite view from the side, showing the interior components of the cubicle.

Unit drives

The illustrated printing press control system is laid out for two folders and for a number of press units that can be operated in any desired number selectively grouped together with one or the other folder, or that can be operated in two separate groups each cooperating with one of the respective folders. The folders and press units as such are not illustrated but are shown represented by their respective unit drive motors.

Figure 1:
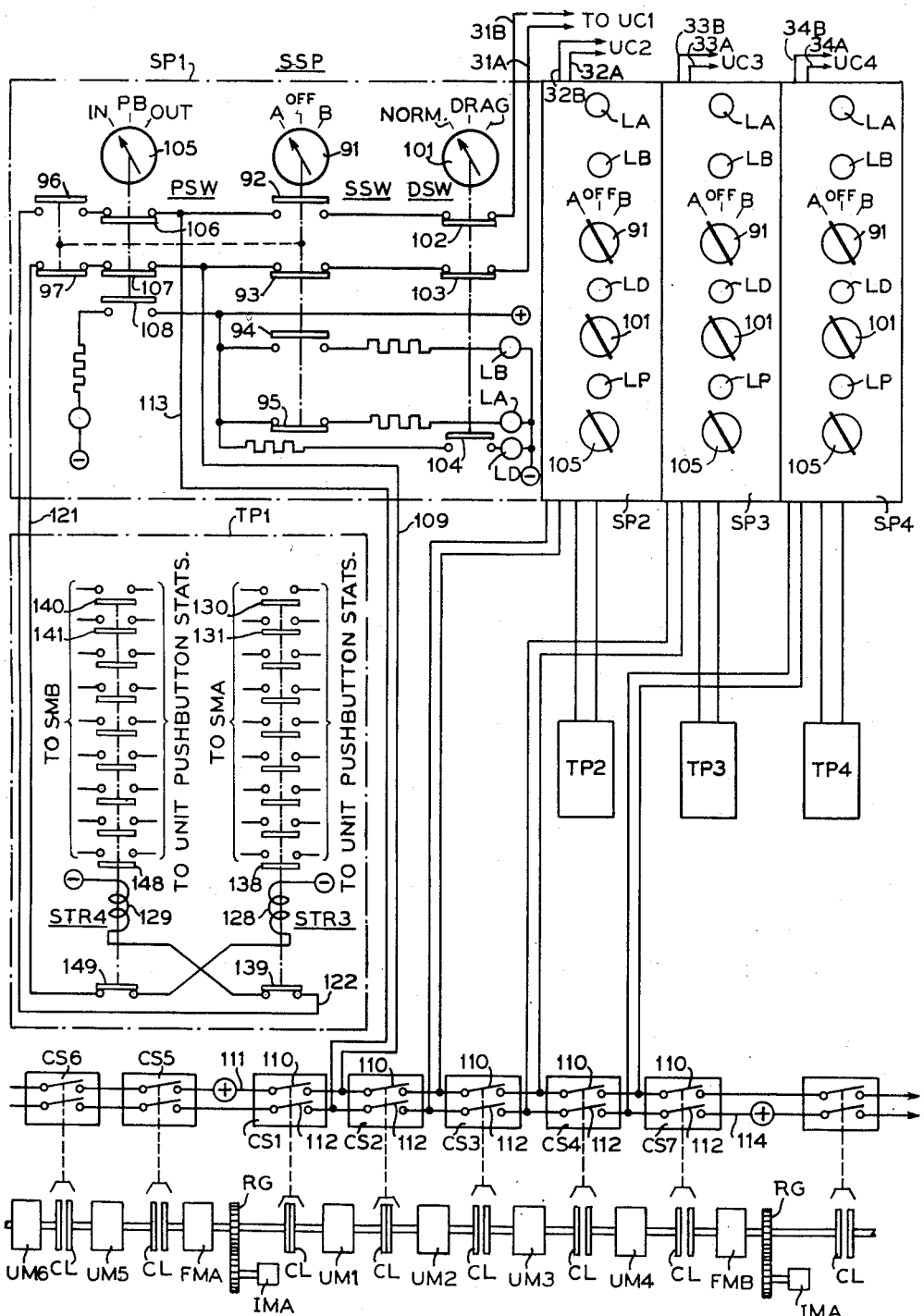
Figure 9:
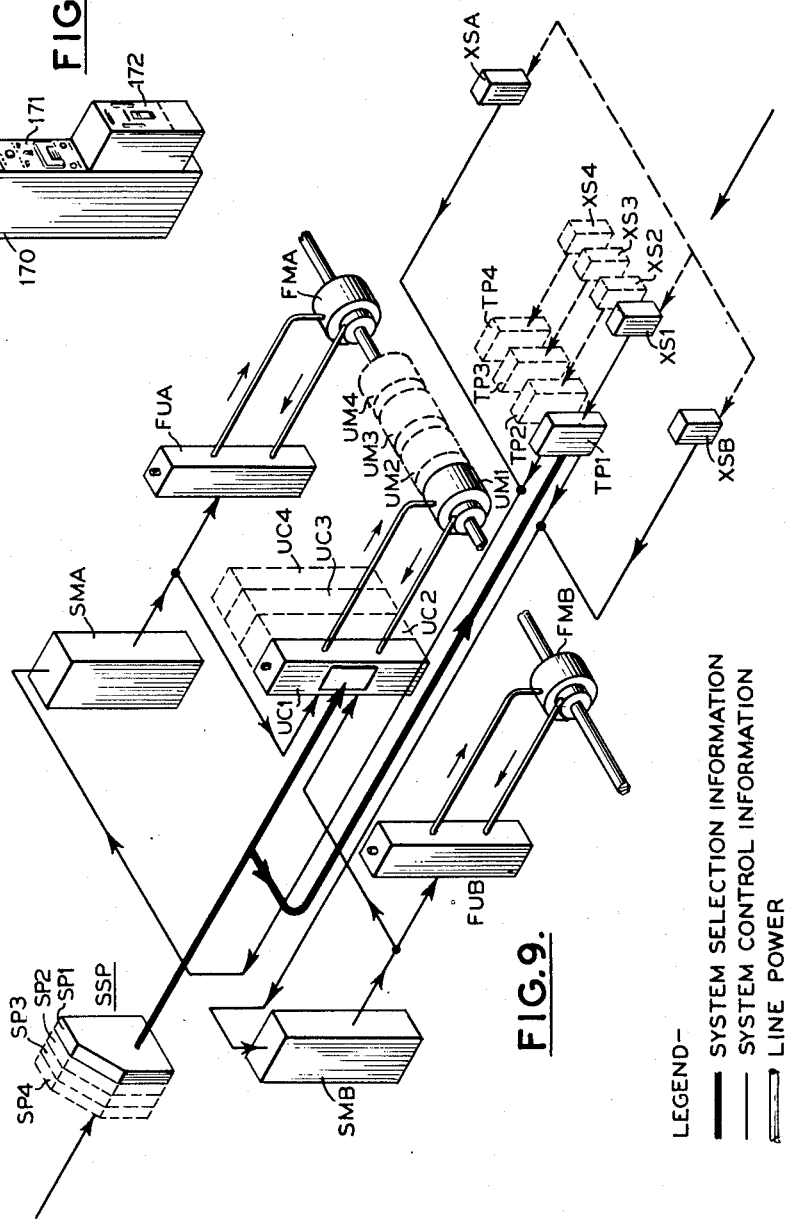
Fig. 9 is a functional flow diagram for explanatory purposes and Fig. 10 a schematic block diagram outlining the general power and control arrangement.
Figure 10:
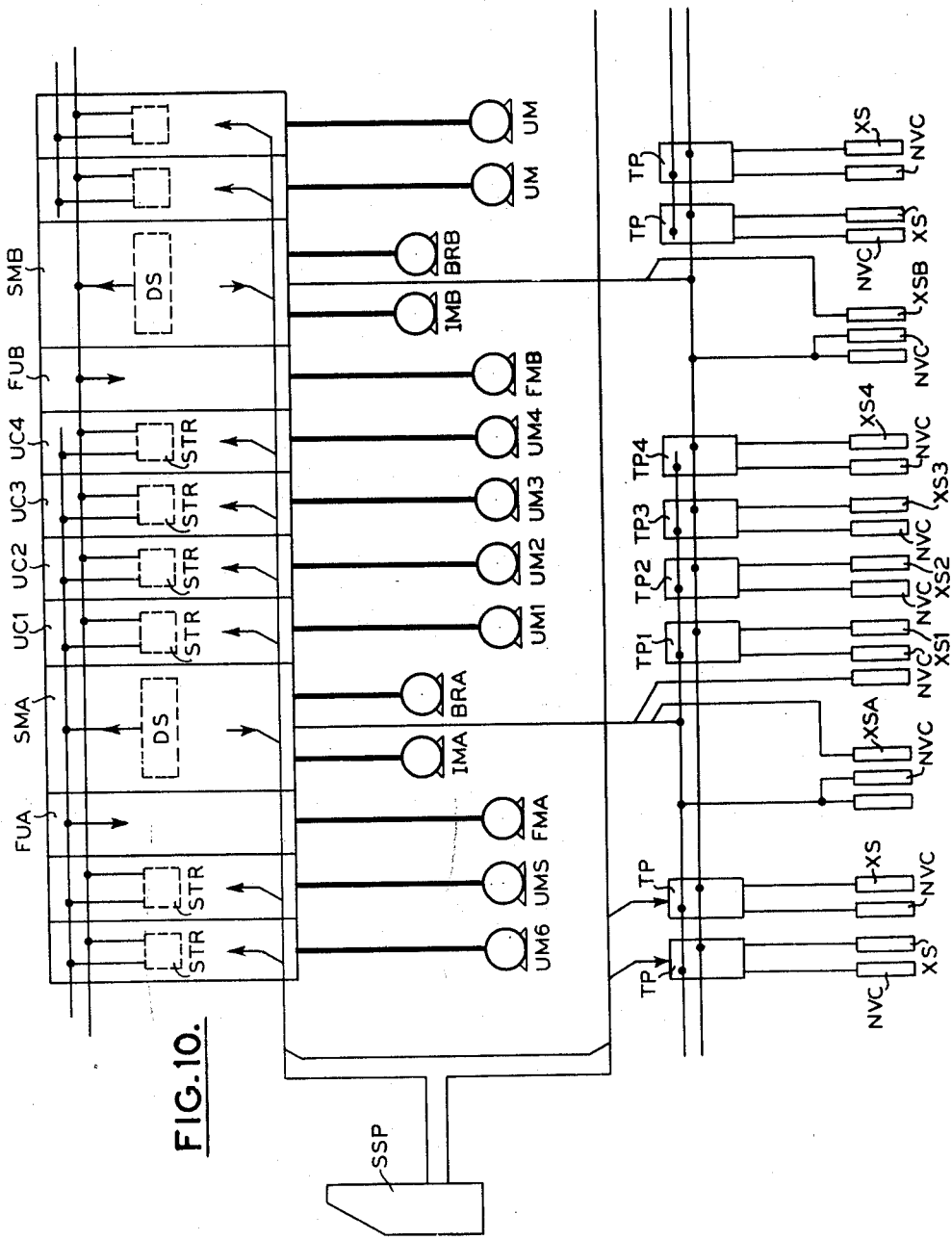

In the shaft alignment diagram at the bottom of Fig. 1 the main drive motors of the two folders are denoted by FMA and FMB. The same motors are schematically represented in Figs. 9 and 10. A circuit diagram of folder motor FMA is shown in the top portion of Fig. 3. A corresponding circuit for folder motor FMB is not shown because it is identical with that of motor FMA.

In Fig. 1 the respective drive motors of six press units are shown at UM1 to UM6. The circuit diagram of motor UM1 is illustrated in Fig. 4. The circuit diagrams of the other press-unit drive motors are not shown, with the exception of the block diagram for motor UM2 represented in Fig. 5, because these circuit diagrams are all identical with the one illustrated in Fig. 4. For simplicity, the flow diagram in Fig. 9 shows only four of the unit drive motors UM1 to UM4, and the circuit diagrams in Figs. 1 to 7, to avoid repetitive illustration of identical components, are likewise presented only for a limited number of press unit drives of four or less.

As shown in the shaft alignment diagram at the bottom of Fig. 1, each folder drive is equipped with a small additional motor IMA or IMB for inching operations. Each inch motor is geared to the shaft of the folder drive motor FMA or FMB by reduction gearing RG. The circuit diagram for the inch motor IMA is illustrated in the top portion of Fig. 2.

As further apparent from the shaft alignment diagram of Fig. 1, the shaft of each unit drive can be coupled with the shaft of an adjacent drive by clutch CL. For instance, unit drives UM1 and UM2 can thus both be clutched together with folder drive FMA so that the two press units are ready for cooperation with the folder driven by motor FMA, this folder being hereinafter referred to as "folder A." If desired, the motors UM4 and UM3, or also the motor UM2 may be clutched together with the motor FMB of the other folder to cooperate therewith, this other folder being hereinafter briefly referred to as "folder B." A number of other group combinations can be set up by corresponding activation of the clutches. For instance, all motors UM1 to UM4 can be grouped together with folder motor FMB.

As will more fully appear below, the units cooperating at a time need not always follow each other in a continuous sequence. It is also possible to establish a connection, for instance, of unit drive UM2 to folder drive FMB and to let one of the intermediate press-unit motors run idle or "drag." Similarly, and as will also be explained below, one of the folders such as folder A can be skipped so that, for instance, the press unit drive UM5 will cooperate with a selected number of intermediate unit drive motors all coupled with folder B.

The line shaft clutches CL are mechanically or electrically connected with respective switches CS1 to CS7 which serve to control and interlock the electric control system. As shown in Fig. 1 for clutch switches CS1 to CS4, these switches are connected with respective panel assemblies SP1 to SP4 of a system selector SSP as will be further described in a later place.

The clutches CL may be individually closed and opened by hand or by electric means. For instance, the operation may be electromagnetical under remote control from the respective panels SP1 to SP4 of the system selector SSP.

Unit controllers

The power circuits and associated control components of the folder and press unit drive motors are designed as individual units which are accommodated in respective cabinets or cubicles. The components that comprise the folder unit controllers FUA and FUB (Figs. 9, 10) are illustrated in the top portion of Fig. 3 for the control unit FUA of folder A.

The folder drive motor FMA has its primary circuit energized from the busses X, Y, Z of an alternating current supply line under control by a contactor DMC. All other drive motors of the system are connected to the same alternating current busses X, Y, Z. The secondary circuit of motor FMA has a bank of resistors in each phase subdivided into a number of serially connected sections, six such sections being illustrated and denoted by one to six in one of the three phases. The resistance values of the sections are graduated in a geometric progression commencing with section 1. For instance if section 1 has a resistance of one ohm or one resistance unit, then the resistance of section 2 is two units, the resistance of section 3 four units, the resistance of section 4 eight units, that of section 5 sixteen units and that of section 6 thirty-two units. This graduation permits a control of the secondary resistance over a total of sixty-four steps. Such control is effected by the normally open contacts of six accelerating contactors AC1 to AC6, each contact being connected across one of the respective resistance sections. When all contactors are dropped out with the exception of the primary contactor DMC, then the full resistance is effective in the secondary circuit of motor FMA for operation at slowest speed. When contactor AC1 alone is picked up, resistance section 1 is shorted so that the total resistance is reduced by one unit of resistance. When contactor AC2 is picked up, section 2 is shorted so that the resistance is reduced by two units of resistance. When contactors AC1 and AC2 are picked up simultaneously, three units of resistance are shorted out of the secondary circuit. When contactor AC3 alone is picked up, four units of resistance are shorted. When contactor AC3 and contactor AC1 are picked up, five units of resistance are shorted and so forth.

The contactors DMC and AC1 to AC6 are connected between the leads 7 and 8 of a current supply source which is symbolically represented by (—) and (+), although it will be understood that this source may supply direct current or alternating current. It is preferred to take the contactor energizing current from two of the alternating current busses X, Y, Z through a transformer which also energizes all other current supply leads denoted throughout the drawings by the same symbols (—) and (+).

The supply of current to contactors DMC and AC1 to AC6 between leads 7 and 8, for selective operation of these contactors in the above described manner, is controlled by the respective contacts of contactors MR and MA1 to MA6 located in a system master controller SMA which will be more fully described in a later place. It will be noted from Fig. 3 that the latter group of contactors also controls the supply of current from lead 8 to the respective busses 10 to 16 of a manifold bus BSA so that each of the individual busses is connected to the supply lead 8 and hence to the pole (+) together with the respective contactors DMC and AC1 to AC6 of folder-unit controller FUA. The manifold bus BSA extends to all other unit controllers, as is apparent from controllers UC1 and UC2 shown in Figs. 4 and 5, with the exception that in the embodiment of Figs. 1 to 5 the folder control unit FUB is not connected to the manifold bus BSA. However, the system master controller for folder B is identical with master controller SMA of Figs. 2, 3 and has the contacts of its corresponding contactors MR and MA1 to MA6 connected to the respective busses 20 to 26 of a second manifold bus BSB (Figs. 4, 5) which extends to all press-unit controllers but is not connected with the master controller SMA for folder A.

Figure 2:
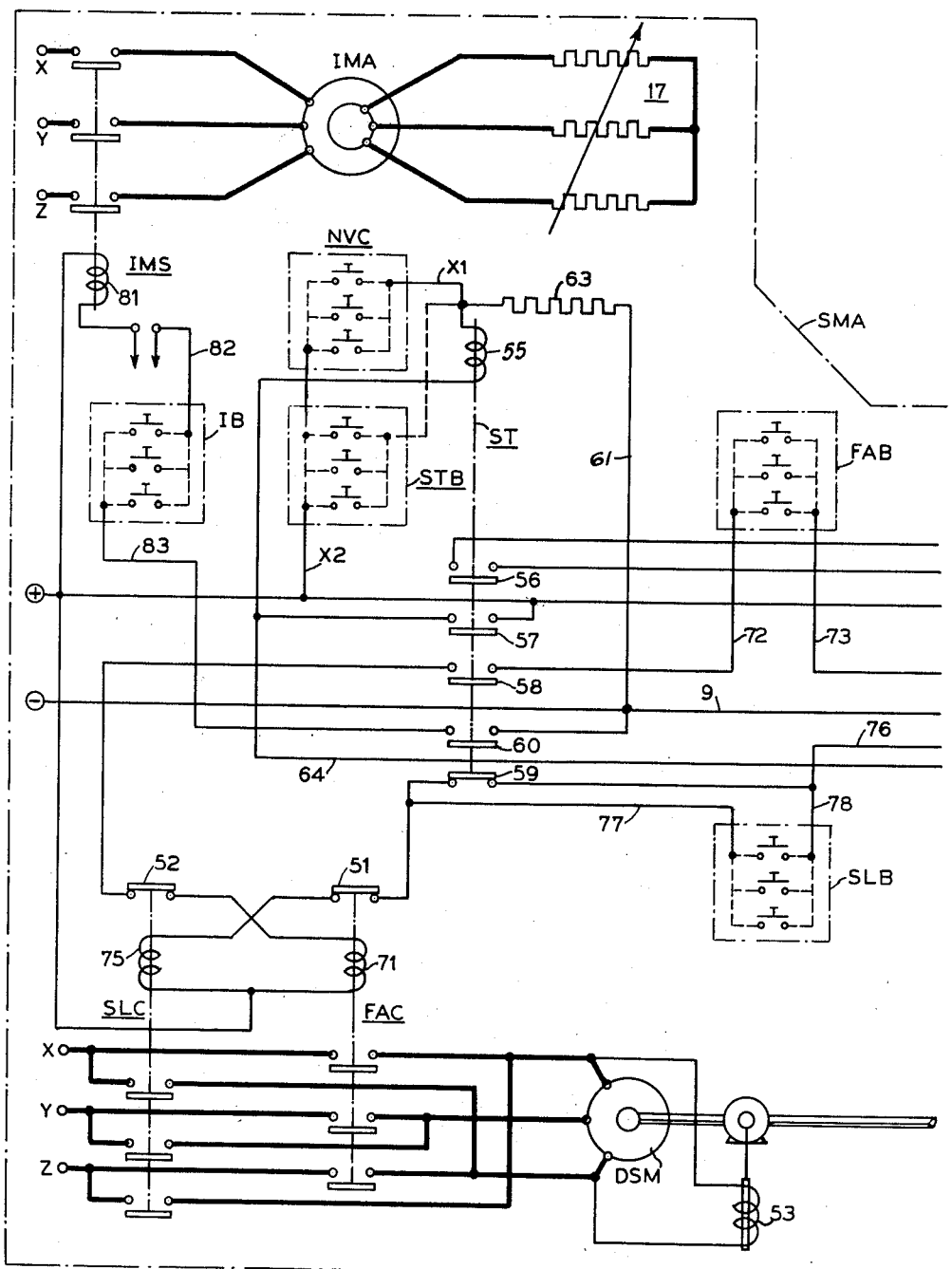

As mentioned above, each folder drive is additionally equipped with a smaller motor for inching operation which is geared to the shaft of the main folder motor by a reduction gearing RG (Fig. 1) comprising an overrunning clutch mechanism. The inch motor IMA for folder A is illustrated in Fig. 2. The contactor and resistance components of the power circuit for this motor may also be located in the unit controller FUA for folder A. However, we prefer, as shown, to mount these components in the cabinet or cubicle of the master controller SMA. The primary circuit of inch motor IMA is connected to the alternating current supply busses X, Y, Z under control by a contactor IMS. The secondary circuit of motor IMA comprises a set of resistors 17 which are adjustable to the desired value; but this value is not changed during normal operation. The inch motor IMA is shown equipped with a normally set and magnetically released brake 18 whose control coil is energized for releasing the brake whenever the primary circuit of motor IMA is energized.

It may be mentioned that the folder motors FMA and FMB are also equipped with a brake, preferably of the hydraulic type, which becomes active when the primary circuit is interrupted. These brakes, being customarily employed, are not illustrated in Figs. 3 to 5; but the appertaining electric actuators are shown at BRA and BRB in Fig. 10.

The unit controllers UC1 to UC4 for the individual press-unit drives, accommodated in respective cabinets or cubicles as apparent from Figs. 9 and 10, are all identical as exemplified by the circuit diagram shown for unit controller UC1 in Fig. 4.

Figure 3:
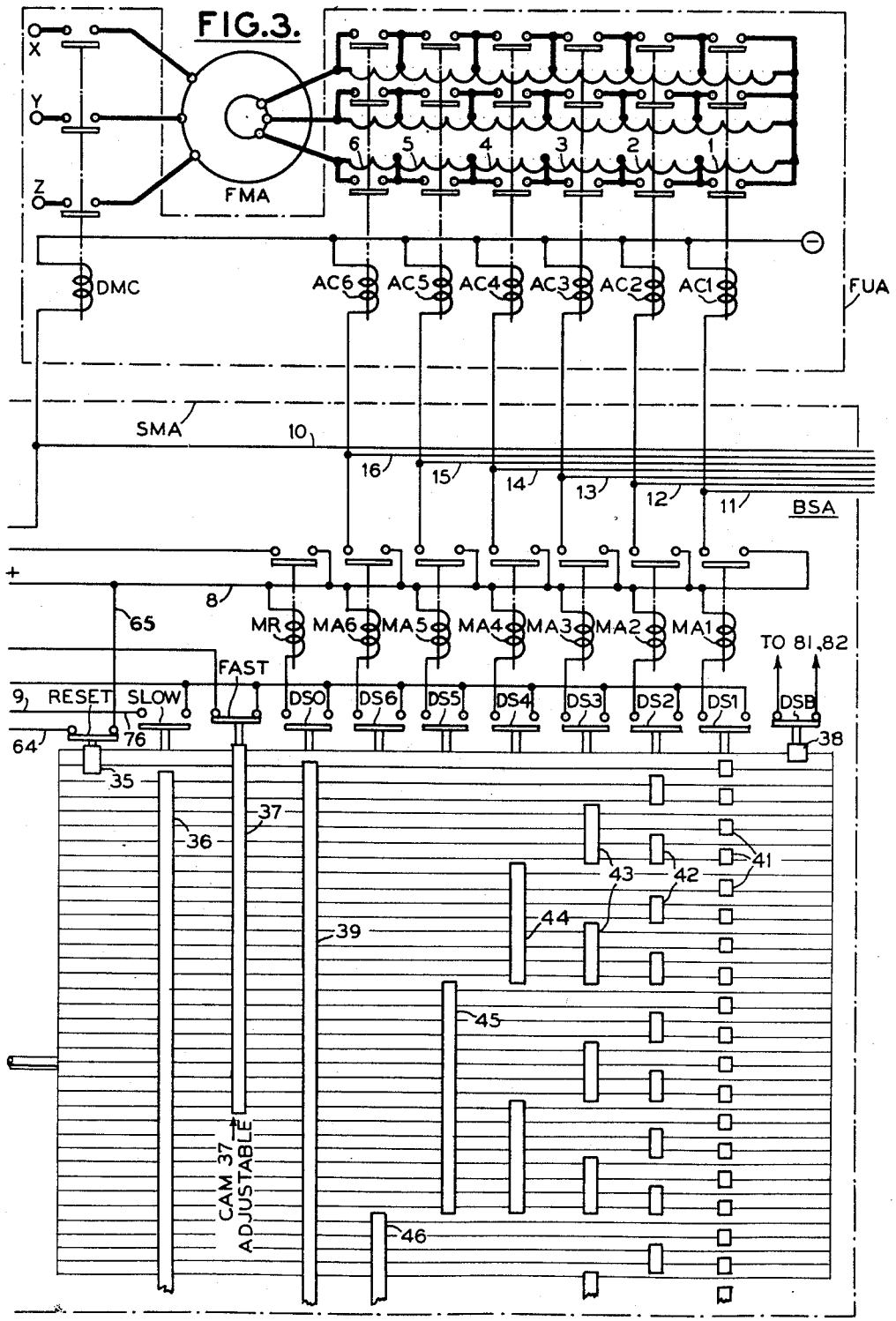
Figure 4:
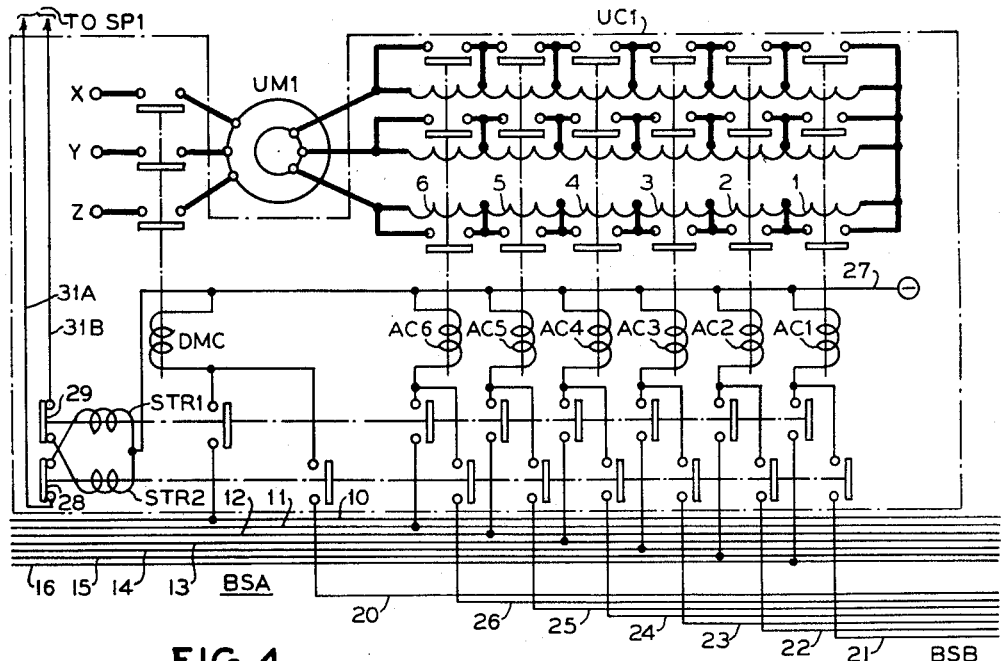

A primary circuit of unit drive motor UM1 is connected to alternating-current busses X, Y, Z under control by a contactor DMC corresponding to the primary contactor DMC of the folder-control unit shown in Fig. 3. The secondary resistance circuit of unit drive motor UM1 is also similar to that of the folder-control unit. That is, the secondary resistance circuit in unit controller UC1 is subdivided into six resistance sections 1 to 6 in exactly the same manner as explained above with reference to folder control unit FUA, and the individual resistance sections are selectively shorted by respective acceleration contactors AC1 to AC6. The contactors DMC and AC6 in unit controller UC1 are all connected through a common supply lead 27 to the pole (—) of the abovementioned current supply source. The control circuits of these contactors are each divided into two branches which are controlled by normally open contacts of two respective system transfer relays STR1 and STR2. The control circuit of relay STR1 extends from supply lead 27 through a normally closed interlock contact 28 of relay STR2, and through a lead 31A to a panel unit SP1 of a system selector SST (Fig. 1). Similarly, the control circuit of relay STR2 (Fig. 4) in unit controller UC1 extends from supply lead 27 through a normally closed interlock contact 29 of relay STR1 and through a lead 31B to the same panel unit SP1 of system selector SSP (Fig. 1). The system transfer relays STR1 and STR2, by means of the connecting leads 31A and 31B, are selectively controlled for operation from the system selector as will be further described in a later place. Due to the operation of the interlock contacts 28 and 29 only one of the two system transfer relays can pick up at a time.

When relay STR1 is picked up it connects the contactors DMC and AC1 to AC6 in unit controller UC1 to the respective busses 10 to 16 of the manifold bus BSA. The unit controller UC1 is then set for control by the operation of the master controller SMA which also controls the operation of the folder control unit FUA described above.

On the other hand, when relay STR2 in unit controller UC1 is energized and closes its contacts, the contactors DMC and AC1 to AC6 in unit controller UC1 are separated from manifold bus BSA and are connected to the respective busses 20 to 26 of the manifold bus BSB leading to the master controller for folder B.

It will be recognized that the system transfer relays STR1 and STR2, controlled from the system selector SST, operate to connect the unit controller UC1, as desired, either with master controller SMA for folder A ("system A") or with the second master controller for folder B ("system B").

The unit controller UC2 for the drive motor UM2 of the adjacent press unit is shown only in block fashion (Fig. 5); but it is apparent that this controller, identical with controller UC1, has a second pair of system transfer relays STR1 and STR2 which connect the primary contactor and the acceleration contactors of controller UC2 either to the manifold bus BSA or to the manifold bus BSB. The selective control of the system transfer relays in controller UC2 is effected through leads 32A and 32B which are connected to panel SP2 of system selector SSP (Fig. 1), and correspond to the above described leads 31A and 31B between system selector panel SP1 and unit controller UC1.

The other press unit controllers UC3 and UC4 (Figs. 9, 10) as well as any additional unit controllers are connected with respective panels SP3 and SP4, etc., of the system selector SSP in an analogous manner. Consequently, any selected number and grouping of the unit controllers can be connected with the master controller SMA for cooperation with folder A or with the master controller SMB (Figs. 9, 10) for cooperation with the folder B.

As a result, all unit controllers switched onto manifold bus BSA for cooperation with folder A will operate and will be controlled by master controller SMA in simultaneous and properly coordinated relation to control unit FUA and drive motor FMA of folder A. For instance, assume that unit controller UC1 (Fig. 4) has received through information circuit 31A an excitation current which causes its system transfer relay STR1 to be picked up. Then the primary contactor DMC in controller UC1 is connected to bus 10 in parallel to the corresponding contactor DMC of the folder control unit FUA. Consequently, when contactor MR in master controller SMA closes its contacts, the two contactors DMC in unit FUA (Fig. 3) and UC1 (Fig. 4) are energized simultaneously, and the corresponding contactors DMC in any other unit controllers then connected to the manifold bus BSA also pick up simultaneously. In a similar manner, when for instance the contactor AC1 in folder control unit FUA is energized by the closing of contactor MA1 (Fig. 3), then the corresponding contactor AC1 in unit controller UC1 as well as the corresponding contactors AC1 in any other unit controller then connected to the manifold bus BSA will also pick up simultaneously. In this manner a synchronized and properly coordinated operation of all motors of a selected group is effected.

*System master controllers*

Each of the two system master controllers SMA and SMB, located in respective cabinets or cubicles (Figs. 9, 10), is the program centers of the entire group of drives that are to cooperate with one another. Each system master controller is designed as illustrated in Figs. 2 and 3 for the SMA master controller to be described presently.

For controlling and programming the speed of all drive motors controlled by master controller SMA, a motor-driven switch of the drum or cam type DS is provided. This switch is shown in the bottom portion of Fig. 3 in developed form, but only a portion of the switch is thus illustrated. Since in the illustrated embodiment the drum switch is to control a total of sixty-four resistance or speed steps of each unit drive motor, the switch has a corresponding number of selective positions or steps. However, for additional control functions, a number of additional switch positions or steps are provided between the off position of the switch and the step that corresponds to minimum speed of the unit drives. The switch DS is shown equipped with eleven cam-controlled switches denoted by "Reset," "Slow," "Fast," DS0, DS1 to DS6 and DSB. In the illustrated off position of the drum switch DS the Reset contact, the Fast contact, and the contact DSB are closed, and all other drum switch contacts are open. The Reset contact opens and the Slow contact closes whenever switch DS is moved away from the off position. The contact DSB opens after the switch DS has passed through its first few positions. The contacts are controlled by respective cams 35, 36, 37 and 38. For controlling the drum switch contact DS1, the switch is further provided with a large number of cams or lobes 41, each occupying one step and being spaced from the adjacent lobe by one idle step. For controlling the contact DS2, the switch DS has cams or lobes 42 that each occupy two speed steps and are spaced two idle steps from each other in proper relation to the cams or lobes 41 to secure the above-mentioned sequencing operation for the accelerating contactors. In an analogous manner the switch DS has cams 43 to 46 for controlling the contacts DS3 to DS6. The peripheral length and positioning of these cams is also in accordance with the above-described sequencing requirements so that when switch DS is progressively moved from off position to highest-speed position, the contactors DMC and AC1 to AC6 in each associated unit controller are caused to progressively increase the speed of the unit drive motors. Accordingly, when the drum switch DS is turned from a position of high speed toward the off position, the speed of all unit drive motors is progressively reduced.

The drum switch DS is driven by a reversible motor DSM of substantially constant speed. The motor DSM is connected to the alternating-current busses X, Y, Z under selective control by two contactors FAC and SLC, whose respective contacts are connected for reversing the phase sequence so that the motor DSM runs in one or the other direction depending upon which of contactors FAC and SLC is picked up at a time. The control circuits of the two contactors are electrically interlocked by normally closed contacts 51 and 52 so that only one of the two contactors can pick up at a time. The motor DSM is provided with a spring-set and magnetically released brake 53 which stops the drum switch DS as soon as the motor becomes de-energized. When the "fast" contactor FAC is picked up, the motor DSM drives the drum switch DS in the forward direction to increase the speed of the unit controllers then under control by master controller SMA. Conversely, when the "slow" contactor SLC is picked up, the motor DSM drives the switch DS in the opposite direction for decelerating the unit drives.

The coil circuits of contactors MR and MA1 to MA6 are energized between the above mentioned leads 8 and 9 of the control-current supply. The contactors pick up to perform the above described sequencing operation when the respective drum switch contacts DS0 and DS1 to DS6 are closed.

The master controller SMA is equipped with a stop relay ST whose control coil 55 acts upon normally open contacts 56, 57, 58, 60 and a normally closed contact 59. This relay serves to immediately stop all unit drives that may be controlled by the master controller SMA, in response to any safety or supervisory signal indicating that an immediate stoppage of printing operation is required. Such stop signals are supplied from any desired number of manually operable push-button contacts STB and any desired number of condition-responsive contacts NVC. Only a few of such contacts are represented in Fig. 2 within dot-and-dash enclosures denoted by STB and NVC. The STB and NVC contacts are distributed throughout the plant. The STB contacts are located in various push button stations. The NVC contacts form part of fault-responsive devices which operate to stop the device, for instance, upon occurrence of a paper break, or in response to voltage failure or other electric irregularities. It should be understood, therefore, that the STB and NVC contacts do not form part of the master controller but appertain to external control stations to be more fully described in a later place. This also applies to the other contacts identified in Fig. 2 by dot-and-dash enclosures denoted by IB, FAB and SLB respectively.

To perform the above mentioned stop control operation, the control circuit of relay ST extends from current supply lead 9 through a lead 61 and a resistor 63 to the control coil 55 of relay ST, thence through a lead 64 and through the Reset contact of drum switch DS to a lead 65 connected with supply lead 8. The STB and NVC contacts are all connected across the coil 55 to make relay ST drop out when any one of these contacts is closed. The Reset contact, as described above, is closed only when drum switch DS is in the off position. Consequently, in this position of the drum switch, and assuming that all external control contacts NVC are closed so that the system is ready for operation, the coil 55 of relay ST is energized in the control circuit just described, and relay ST picks up and closes its contacts 60, 56, 57, 58 while opening the contact 59. Contact 57 now closes a self-holding circuit for coil 55 so that this coil remains energized to keep relay ST picked up when thereafter the drum switch DS is moved away from its off position. Now the stop relay ST can be made to drop out only by actuation of any one of the stop contacts STB which are distributed throughout the plant, or by the closing of any one of the external control contacts NVC. Whenever this occurs, the relay contact 56 will open. This relay contact is connected in series between supply lead 8 and bus 10 of manifold BSA (Figs. 2, 3). Consequently, none of the DMC contactors in the respective primary circuits of all unit drives under control by master controller SMA receives excitation when contact 56 in stop relay ST is open. As a result, the actuation of any one stop contact STP or of any one of the NVC contacts has the immediate effect of bringing all drive motors of system A to standstill. At the same time the contact 57 in relay ST opens the self-holding circuit and since, when the unit drives were previously running, the master controller DS is in some position other than the off position, the stop relay ST cannot pick up again unless the drum switch DS is first returned to the off position in which the Reset contact of the drum switch is again closed.

The contacts 58 and 59 of stop relay ST control the coil circuit of the "fast" contactor FAC and "slow" contactor SLC for drum-switch drive motor DSM in the manner apparent from the following description of these coil circuits.

The circuit of coil 71 in contactor FAC extends between control current supply leads 8 and 9 as follows:

8–71–52–58—lead 72—FAB—lead 73—Fast contact of DS–9

This circuit is normally interrupted by a number of mutually parallel connected "faster" push buttons FAB. In the off position of drum switch DS the cam 37 keeps the Fast contact closed, and this contact remains closed during a sequential number of drum switch positions. The cam 37 is preferably adjustable so that it can be made to extend over a desired peripheral length of the drum switch. When the adjusted end of cam 37 is reached, which occurs at a relatively high speed the Fast contact is opened and then prevents further energization of coil 71 in "fast" contactor FAC. As explained, whenever contactor FAC picks up, the drum switch drive motor DMS advances the drum from step to step toward a higher-speed position, and this takes place whenever anyone of the "faster" buttons FAB is depressed in any one of the external control stations of the plant. Such operation of contactor FAC and therefore the advance of drum switch DS in the accelerating direction are dependent upon the closing of contact 58 in stop relay ST. Hence if, for any reason, the stop relay ST drops out and stops all unit drives by causing an interruption of their primary power circuit, the "fast" contactor FAC can no longer pick up and the drum switch cannot be advanced to any position of higher speed.

The control circuit for coil 75 of the "slow" contactor SLC extends between control current supply leads 8 and 9 as follows:

8–75–51–59—lead 76—Slow contact of drum switch DS–9

A number of "slower" push button SLB are all parallel connected to stop relay contact 59 by leads 77 and 78.

As explained, during operation of the system, the stop relay ST remains picked up and its contact 59 is open. Consequently, the coil circuit of contactor SLC is normally open at the "slower" buttons SLB. In the off position of drum switch DS the circuit is further interrupted by the Slow contact (Fig. 3), so that the "slow" contactor SLC (Fig. 2) cannot pick up. However, in any other speed position of drum switch DS, the contact Slow is closed. Under these operating conditions, the actuation of any one of the "slower" buttons SLB causes contactor SLC to pick up and to operate the drum-switch drive motor DSM in the speed-decelerating direction until, if desired, the off position is reached and the Slow contact is opened.

As explained, when during running condition of the system any one of the stop contacts STB or any one of the contacts NVC is actuated, the stop relay ST drops out, stops all unit drives and opens the control circuit of "fast" contactor FAC. Simultaneously therewith, contact 59 in relay ST is closed, and since this contact is connected in parallel to the "slower" buttons SLB, it closes the coil circuit of "slow" contactor SLC so that the drum switch DS is now driven from the position previously occupied back to the off position. When the off position is reached the drive motor DSM is stopped by the opening of the DS-Slow contact. The system is now reset for resuming its operation, for instance after the trouble which causes opening of an NVC contact is eliminated.

As described, the control contactor IMS and the control resistors 17 of the inch motor IMA are also housed in the cubicle of the master controller SMA. As shown in Fig. 2, the circuit for the control coil 81 of contactor IMS extends between control current supply leads 8 and 9 as follows:

8–81—contact DSB of drum switch DS—lead 82—inch buttons IB—83–60–9

The drum switch contact DSB, as shown in Fig. 3, is closed when the drum switch DS is in the off position. Consequently, when the drum switch DS is off and the stop relay ST (Fig. 2) is picked up and has closed its contact 60, the inch motor IMA can be actuated by depressing any one of the inch buttons IB which are located in the various push-button stations of the plant. The inch motor IMA cannot be operated when the drum switch DS is displaced from the off position sufficiently to make the cam 38 (Fig. 3) open the contact DSB, or whenever the stop relay ST has dropped out due to actuation of any one of stop contacts STB or the occurrence of any event that has caused closing of any one of the contacts NVC.

It will be understood from the foregoing that the master controller is the brain or programming center of the entire system of unit drives connected thereto and, by drum-switching relatively small currents, keeps the high-power individual drives, operating as separate electrical units, precisely in step with one another and subjects them to exactly the same control operations that may be initiated from any of the external control stations or fault-responsive supervisory devices.

Fault-finder lights, test lights (not shown) as well as test and emergency switches, such as one of each of the push buttons IB, STB, FAB and SLB, are preferably located on the front panel of the master controller cubicle to aid in trouble shooting and controlling the operation of the system.

System selector

As described, the system of press-make-up is made by the system selector. The system selector SSP (Figs. 1, 9, 10) is composed of a number of identical units or selector panels such as those denoted by SP1, SP2, SP3, SP4. Each panel is associated with one of the respective press unit controllers and is equipped with circuit components for selectively switching the associated unit controller into system A or system B depending upon the press-run requirements of a particular printing operation.

In Fig. 1 the front of each selector panel SP2, SP3, SP4 is illustrated, whereas the selector panel SP1 is shown schematically in detail with respect to its electrical components, it being understood that actually the size and design of panel SP1 is identical with that of the other selector panels which are all put together to form a small desk-type assembly (Figs. 9, 10) conveniently located near the center of press operations, in the superintendent's office, control room or any other desired location. This centralizes the supervision of press control and eliminates time-consuming trips to out-off-the-way control rooms where, heretofore, the press make-up has been made by the throwing of large multi-bladed knife switches.

Figure 5:
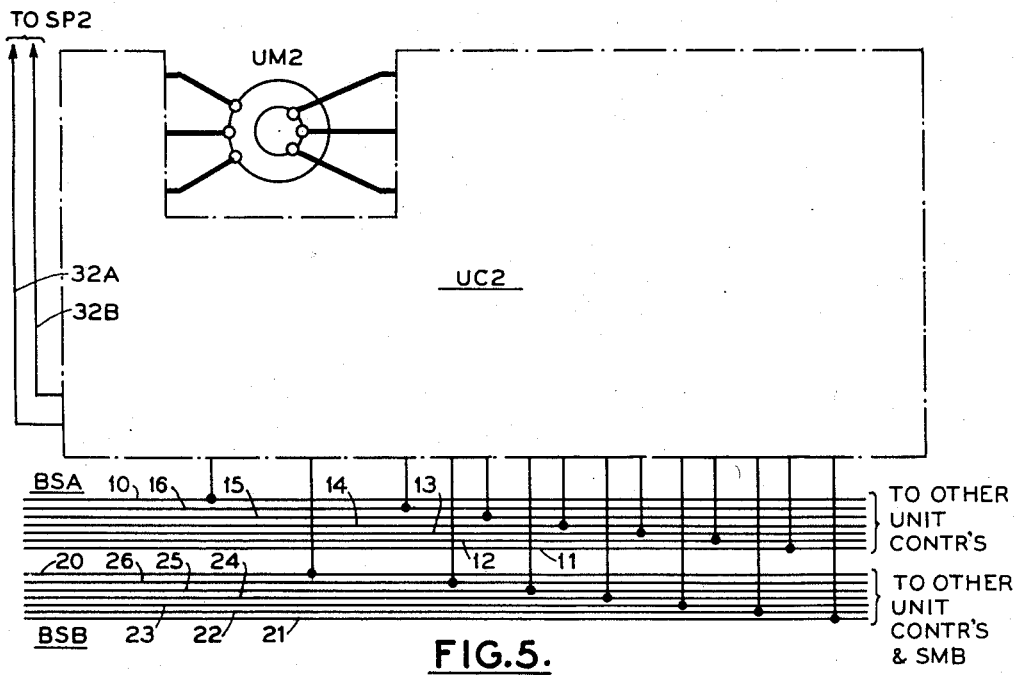

As described above, the system selector panel SP1 (Fig. 1) is connected by leads 31A and 31B with the respective system transfer relays STR1 and STR2 in unit controller UC1. Similar leads 32A and 32B extend from selector panel SB2 (Fig. 1) to the system transfer relays in unit controller UC2 (Fig. 5). Leads 33A, 33B extend from panel SB3 (Fig. 1) to third unit controller, and leads 34A and 34B extend from selector panel SB4 to the fourth unit controller. In this manner, any other unit drive is connected with a corresponding selector panel of the system selector SSP.

Selector panel SP1, as well as each of the other panels, is provided with a three-position "selector" switch SSW, a two-position "drag" switch DSW and a two-position switch PSW. Switch SSW has six contacts 92 to 97 actuated by means of a handle 91. Switch DSW has three contacts 102, 103, 104 controlled by a handle 101 which is normally in the illustrated position marked "Norm" and can be shifted to position "Drag." Switch PSW has a handle 105 which controls three contacts 106, 107, 108 and is normally in the position marked "PB in."

When handle 91 of selector switch SSW is in the "off" position, contacts 92 to 97 are all open. When switch SSW is in position "A" as illustrated in Fig. 1, contacts 92, 94 and 96 are open and contacts 93, 95, 97 are closed. In this switch position, the lead 31A coming from system transfer relay STR1 in unit controller US1 (Fig. 4) is connected through contacts 103, 93 and a lead 109 with a contact 110 of clutch switches CS1 which, when the associated clutch CL between folder drive FMA and unit drive UM1 is closed, completes the circuit between the (—) pole of lead 27 in unit controller UC1 (Fig. 4) and the (+) pole of lead 111 at clutch switch CS1 (Fig. 1). Then the relay STR1 in unit UC1 (Fig. 4) is energized and, as described, connects the contactors of controller UC1 to the manifold bus BSA for cooperation with folder A in system A. At the same time, contact 95 in selector panel SP1 (Fig. 1) closes a circuit for a single lamp LA to indicate at the panel front that unit controller UC1 is set up for operation in system A.

Each clutch switch CS1 to CS4 has another contact 112 which, like contact 110, is closed only when the associated clutch is closed. When all clutches between unit drive UM1 and folder drive FMB are closed and the handle 91 of switch SSW in selector panel SP1 is placed in position B, contacts 102, 92 connect lead 31B through lead 113 and the then closed contacts 112 of clutch switches CS2 to CS4 and CS7 with the (+) pole of lead 114 so that system transfer relay STR2 in unit controller UC1 (Fig. 4) is energized and connects the control contactors of this controller to the manifold bus BSB for operation in system B. Simultaneously, the contact 94 (Fig. 1) closes the circuit of a signal lamp LB which indicates at the panel front that controller UC1 is connected into system B.

The "Drag" switch DSW permits disconnecting the power supply to the unit drive without taking the drive out of the selected system set-up. When handle 101 of switch DSW is placed in "Drag" position, the contacts 102 and 103 open the coil circuits of the system selector relays in the unit controller connected to the selector panel so that none of the contactors DMC and AC1 to AC6 (Fig. 4) can pick up. Then the motor remains mechanically coupled into the operating system but runs or is "dragged" by the other motors of the system without supplying driving power. This can be done, for instance in an emergency, when it is desired to disconnect the motor from the power supply line leaving all of the control devices of the unit in operation. In the "Drag" portion of switch DSW, its contact 104 lights a signal lamp LD at the panel front.

The system selector also controls the proper routing of the external control and supervisory signals that issue from the push button stations and condition responsive devices of the plant, so that these signals are always supplied to the one master controller which, in accordance with the selected system set-up, controls and programs the particular machinery to which the signal is correlated. This selective routing of the signals is effected by the contacts 96 and 97 in switch SSW as shown in Fig. 1 for system selector panel SP1. Each of the two contacts, when closed, connects the (+) bus at lead 111 or 114 of the current supply through lead 109 or 113 and contact 106 or 107 to an outgoing lead 121 or 122. Such connection for lead 121 is made only when the handle 91 of system selector switch SSW is in the illustrated position "A," whereas a connection for lead 122 is made only when handle 91 is set to position "B."

As will be explained, leads 121 and 122 are connected to a signal transfer unit TP1 which controls the selective transfer of the push-button stations and other signalling devices, but such transfer control is effective only when the switch PSW in selector panel SP1 is in the illustrated "PB in" position. When switch PSW is placed in "PB out" position, its contacts 106, 107 interrupt the transfer control circuits so that the push-button stations and other control devices remain ineffective. Thus, the switch PSW permits the push-button controls and condition-responsive controls to be switched off while leaving the unit drive motor operational under power.

The above-mentioned transfer of the signal circuits between systems A and B, and the signal transfer units TP1 to TP4 (Fig. 1) that effect such transfer will now be described more in detail.

*Signal transfer panels*

Each of the signal transfer units TP1 to TP4 (Figs. 1, 9, 10) is correlated to one of the respective press unit drives. The components of each signal transfer unit are preferably mounted on a panel and for that reason are hereinafter briefly referred to as signal transfer panels. These panels may be installed in respective cabinets or cubicles as illustrated in Figs. 9 and 10. However, they may also form part of the respective unit controllers or may be combined with push-button stations; it being preferable, in accordance with a feature of the invention, to design the signal transfer panels as individual subassemblies so that they can be mounted into, or taken out of, the installation by means of plug-in connections as described in a later place and as preferably used for each of the other individual subassemblies of the entire installation.

The interior components and circuits of the respective signal transfer panels are all identical and as shown in Fig. 1 for signal transfer panel TP1.

The transfer panel is provided with two signal transfer relays STR3 and STR4. The coil 128 of relay STR3 controls normally open contacts 130 to 138 and a normally closed interlock contact 139. The coil 129 of relay STR4 controls normally open contacts 140 to 148 and a normally closed interlock contact 149. The control circuit of transfer relay STR3 extends from the current supply bus (—) through coil 128, interlock contact 149, contacts 97 and 107, lead 109, contact 110 of clutch switch CS1 to lead 111 and bus (+). As mentioned, contact 110 is closed only when the clutch CL between the shaft of folder drive FMA and unit drive UM1 is closed so that the unit drive UM1 forms part of system A. Hence, when contact 110 in clutch switch CS1 is closed, lead relay STR3 picks up and keeps its contacts 130 to 138 closed as long as the system selector switch SSW in selector panel SB1 is in position "A" as illustrated in Fig. 1. The opening of interlock contact 139 then prevents excitation of relay STR4.

The control circuit of relay STR4 extends from current supply bus (—) through coil 129, interlock contact 139 and lead 113 to contact 112 in clutch switch CS2. This circuit is closed only when switch SSW is in position "B" so that contact 96 is closed, and when all clutches between the shaft of unit drive motor UM1 and folder drive motor FMB are closed.

It will be recognized that in each signal transfer panel the transfer relay STR3 is picked up only when the selector switch SSW in the one associated system selector panel is set to position "A," provided the clutches of the line shaft arrangement are properly set to operate the associated unit drive as a member of the system A then set up for operation. Similarly, when the selector switch SSW in any one of the selector panels is set to position "B" for grouping the associated one unit drive into system B, then only the signal transfer relay STR4 in the correlated one signal transfer panel is kept in picked-up condition while the relay STR3 is de-energized. It will be understood that a pair of signal transfer relays STR3 and STR4 is provided in each of the signal transfer panels.

*External control devices*

It has been mentioned that the push-button contacts and condition-responsive contacts shown as dot-and-dash surrounded groups IB, STB, FAB, SLB, NVC in Fig. 2 are distributed throughout the printing press plant. Most of them are not permanently connected with master controller SMA for system A but, by operation of the signal transfer relays STR3 and STR4, are selectively and automatically connected either with master controller SMA or master controller SMB depending upon the system make-up selected by means of the system selector. This will now be described in detail.

While, as explained, the system build-up is controlled from the system selector, the actual performance of the system, once set up, is subject to control by external push-button stations as well as by fault-responsive and other condition-responsive signals.

Figure 6:
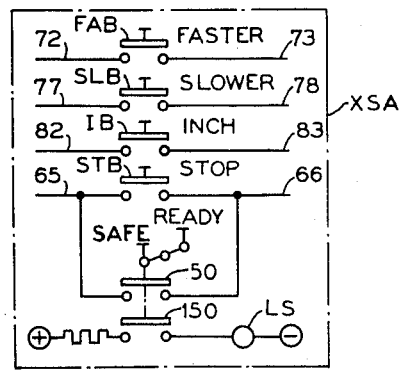
Fig. 6 is a circuit diagram of a push button station for one of the folders of the plant, Fig. 7 a circuit diagram of a push button station for one of the press unit drives, and Fig. 8 a circuit diagram of fault-responsive control contacts.

Six such push-button stations are shown in Figs. 9 and 10 and are denoted by XSA, XSB, and XS1 to XS4. Stations XSA and XSB are associated with folder A and folder B, respectively, and are located at these folders. The two stations are identical and are electrically equipped as shown in Fig. 6 for station XSA.

Station XSA comprises one "faster" button FAB, one "slower" button SLB, one "inch" button IB, and one "stop" button STB. Button contact FAB is directly connected between leads 72 and 73 of master controller SMA, these leads being identical with the respective leads 72 and 73 shown in Fig. 2. Similarly, the push-button contacts SLB, IB, STB are directly connected between the master-controller leads identified in Figs. 6 and 2 by the same respective reference numerals.

In accordance with safety regulations to be observed in printing plants, station XSA is further provided with a Safe-Ready switch 150 connected in parallel to the stop contact STB. Switch 150 has two push buttons denoted by Safe and Ready respectively. When the Safe button is depressed, the switch 150 is closed and stays closed until the Ready button is depressed. As long as switch 150 is closed, none of the drives associated with folder A in system A can operate. This "safe" condition is signalled by a lamp LS, controlled by a contact 151, to indicate that any work on or in the folder machinery may be safely performed. When the machinery is ready for operation, the Ready button must be depressed, lamp LS is extinguished and, if all other Ready buttons in the same system are also depressed, the system can operate under control by any of the normally open push-button switches associated with the system.

Figure 7:
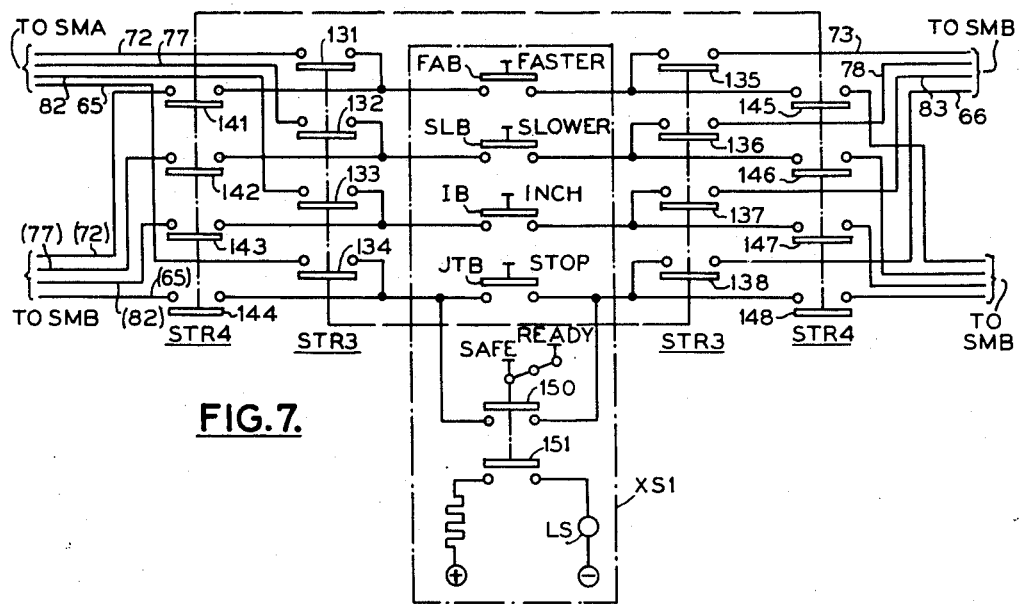

Each of the push-button stations XS1 to XS4 and any others that may be provided in the system and are located on or at the respective press units are designed in accordance with the circuit diagram shown in Fig. 7 for station XS1.

Station XS1 is provided with one "faster" push button FAB, one "slower" button SLB, one "inch" button IB, one "stop" contact STB, and a Safe-Ready switch in the same manner as described above with reference to the push-button station XSA shown in Fig. 6. However, the push-button contacts and the switch in station XS1, as well as in the other push-button stations associated with the respective press-unit drives, are not permanently connected with the master controller but are selectively connected by the signal transfer relays STR3 and STR4 (as shown for signal transfer panel TP1 in Fig. 1) either with master controller SMA or with master controller SMB depending upon whether relay STR3 or relay STR4 in the signal transfer panel is energized. For convenience of illustration, the contacts 131 to 138 of relay STR3 are shown in Fig. 7 in two groups; and the contacts 141 to 148 of relay STR4 are likewise shown in two groups.

According to Fig. 7, the "faster" push button FAB is connected between leads 72 and 73 only when transfer relay STR3 has picked up and has closed the contacts 131 and 135, the leads 72 and 73 in Fig. 7 being identical with those denoted by the same respective reference numerals in Fig. 2. On the other hand, when transfer relay STR4 is energized so that contacts 131, 135 are open and contacts 141, 145 are closed instead, the push button FAB in station XS1 is connected between leads (72) and (73). These two leads then connect the push button FAB with the master controller SMB for system B. As mentioned, relative to design and operation the master controller SMB is identical with master controller SMA. Accordingly, the leads denoted in Fig. 7 by (72) and (73) correspond in master controller SMB exactly to respective leads 72 and 73 of master controller SMA in Fig. 2.

In a similar manner, the push-button switches SLB, IB and STB, as well as the Safe-Ready switch in push-button station XS1 are connected either by signal transfer relay STR3 with master controller SMA, or by transfer relay STR4 with master controller SMB, depending upon the make-up of the system as selected in the system selector SSP (Fig. 1). It will be understood that the reference numerals identified by parentheses, such as leads (77) and (78), are connected with master controller SMB and correspond to the leads denoted in Fig. 2 by the respective numerals such as 77 and 78.

Figure 8:
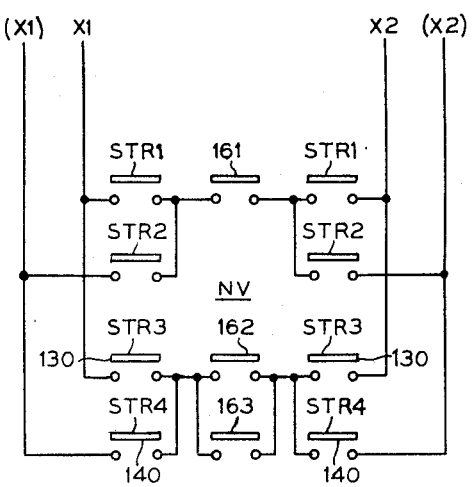

The condition-responsive contacts schematically indicated in Fig. 2 and cumulatively denoted by NVC are likewise controlled by the transfer relays STR3 and STR4 or by the transfer relays STR1 and STR2, so that these contacts are always connected with the one master controller that governs the operation of the particular machinery units in which the condition-responsive signals originate. Fig. 8 shows, for instance, a circuit diagram for three NVC contacts located in or on the printing-press unit operated by unit drive UM1 under control by unit controller UC1. These three contacts are denoted by 161, 162 and 163. One of them may form part of a voltage-relay arrangement which responds to voltage failure, another one may form part of a paper-break indicator, and one or more other contacts may serve other supervisory purposes. When this particular press unit, in accordance with the selected setting of selector panel SP1 in system selector SSP (Fig. 1) is set up to form part of system A so that, as explained, the signal transfer relay STR3 is energized, then the two NVC contacts 162 and 163 are connected by the closed contacts 130 of relay STR3 (Figs. 1, 8) between leads x1 and x2 of master controller SMA as illustrated in Fig. 2. However, when the press unit is grouped into system B so that the signal transfer relay STR4 is energized, then the contacts 140 (Fig. 8) of relay STR4 connect the NVC contacts 162, 163 of the press unit between leads (x1) and (x2) which are connected with the stop relay ST in the master controller SMB and which correspond to respective leads x1 and x2 in Fig. 2. Some of the NVC contacts may also be controlled by the transfer relays STR1 and STR2 as is shown in Fig. 8 for NVC contact 161. In this manner, the condition-responsive contacts in each unit of the plant are always automatically switched into connection with the one master controller that governs the operation of that particular unit.

When, as illustrated in Fig. 3, the folder control unit FUA is always connected with the master controller SMA, and analogously the folder control unit FUB is always connected with the master controller SMB, then the condition-responsive NVC contacts located in or on each folder may be directly connected to the respective leads x1 and x2.

*Operation*

Before continuing the description of the illustrated equipment, it will be helpful to first review the operation of the system according to Figs. 1 to 8 as a whole.

The desired press make-up is made by closing the proper clutches CL of the line shaft arrangement (Fig. 1) and by placing the selector switch SSW for each unit controller of the selected group into the proper position. Assume, for instance, that the unit drives UM1 and UM2 are thus selected for coaction with folder drive SMA to operate in system A. Then the selector switches SSW in selector panels SP1 and SP2 (Fig. 1) are both placed in position A. This connects the press-unit controllers UC1 (Fig. 4) and UC2 (Fig. 5) through manifold bus BSA with master controller SMA. However, each of the drive motors UMA, UM2, if desired, can be kept disconnected from the power supply line by placing the switch DSW in selector panel SP1 or SP2 into "Drag" position. Then the drive motor remains deenergized during the operation of system A and is merely dragged along by the folder drive FMA and the other press-unit drives. If nothing further is done, all control devices, including the push-button contacts, associated with the press unit connected with the dragged drive motor remain in operative condition. If desired, these control devices may also be placed out of action by shifting the switch PSW in the proper system selector panel to the position "PB out."

For further explanation, assume that the switches SSW, DSW and PSW of selector panels SP1 and SP2 are all in the positions illustrated in Fig. 1. With this setting, the unit drives and control devices are all in operative condition. Further assume that the drives are all at rest and that the drum switch DS in master controller SMA is in the off position as illustrated in Fig. 3.

Now, as long as work is being done in or at the folder or any of the press units in system A, the Safe button remains depressed, this being indicated at each push-button station by the signal lamp LS (Figs. 6, 7). As long as any one of the Safe buttons in system A is thus depressed, the contact 150 prevents the stop relay ST in master controller SMA (Fig. 3) from picking up. Consequently, since contact 56 of this relay controls the supply of current to the primary contactor DMC in each unit controller, none of the drive motors can operate, and the inch motor IMA of the folder drive (Fig. 2) can likewise not be placed in operation because the control circuit of its primary contactor IMS is interrupted at contact 60 of stop relay ST. When the work in each unit is completed, the attendant depresses the Ready button which opens the switch contact 150 (Figs. 6, 7), this being indicated by the fact that the signal lamp LS is extinguished.

After all Ready switches are thus depressed, the printing press drive for system A can be started at any push-button station. As explained, all push-button stations associated with the press-unit controllers that are grouped together to form the system A, are now connected with the master controller SMA by previous actuation of the corresponding signal transfer relay in each of the signal transfer panels XS1 and XS2. With the assumed press make-up, only the contactors STR3 in both signal transfer panels are picked up so that all signals originating throughout system A are routed to master controller SMA.

When all Ready buttons are depressed, the drive can be operated at inching speed by depressing any one of the "inch" buttons IB (Figs. 2, 6, 7) in any push-button station of system A. This has the effect of energizing the primary contactor IMS of inch motor IMA through the contactor control circuit which extends through the drum-switch contact DSB. Contactor IMS drops off and inch motor IMA stops as soon as the inch button IB is released. It will be noted that such inching operation is available only as long as the drum switch DS is in the off position or, if desired, in a few next adjacent positions, depending upon the peripheral length of the control cam 38 in drum switch DS.

For starting the drive, when all Ready buttons are depressed, any one of the "faster" buttons FAB is to be depressed. This causes the "fast" contactor FAC (Fig. 2) to pick up so that the drum-switch drive DSM operates to advance the drum switch DS stepwise from the off position.

During the sequential progression of drum switch DS, the contactors DMC and AC1 to AC6 in the folder unit controller FUA as well as in the press unit controllers UC1 and UC2 are actuated in the above-described sequence so that the resistance in the secondary circuits of all drive motors in system A are incrementally reduced in simultaneous and properly correlated operation, thus increasing the driving speed of the system. When the desired speed is reached, it is only necessary to release the "faster" button FAB. Thereafter the drum switch DS remains in the position previously reached, and the system continues operating at the selected speed.

For reducing the speed, any one of the "slower" buttons SLB is to be depressed. This causes the "slow" contactor SLC to energize the drum switch drive DSM for rotating the drum switch in the direction toward the off position. When the desired slower speed is reached, the previously depressed "slower" button SLB is to be released to continue the operation of the system at that speed. If the "slower" button SLB is kept depressed until the drum switch DS reaches the off position, the Slow contact of the drum switch opens and interrupts the control circuit of "slow" contactor SLC (Fig. 2) so that the drum switch drive DSM is stopped.

If during operation of the system the "stop" button STB or the Safe button is actuated in any one of the pushbutton stations, or if any one of the condition-responsive contacts NVC opens, for instance in response to web break or voltage failure, then the stop relay ST drops out and immediately stops the operation of all drive motors in the system. At the same time, the drum switch drive DSM is energized by contactor SLC to return the drum switch to the off position, whereafter the drive DSM is stopped. Operation of the system cannot be resumed until the drum switch DS is returned to the off position because the stop relay ST can be made to pick up again only when the Reset contact of drum switch DS is closed which is the case only in the off position of switch DS.

During the operation of system A, the system B comprising the folder drive FMB and the master controller SMB together with other press unit drives and unit controllers may or may not be in operation in a similar manner.

*Alternatives*

It will be obvious to those skilled in the art upon a study of this disclosure that systems according to the invention permit of various alterations and modifications with respect to the circuitry of the system as a whole, or of its individual subassemblies, or with respect to the individual devices and other components. Some of these possibilities of modification will be described presently because they are readily available to the manufacturer or user of the plant within a system design otherwise similar to the one described in the foregoing.

Figure 11:
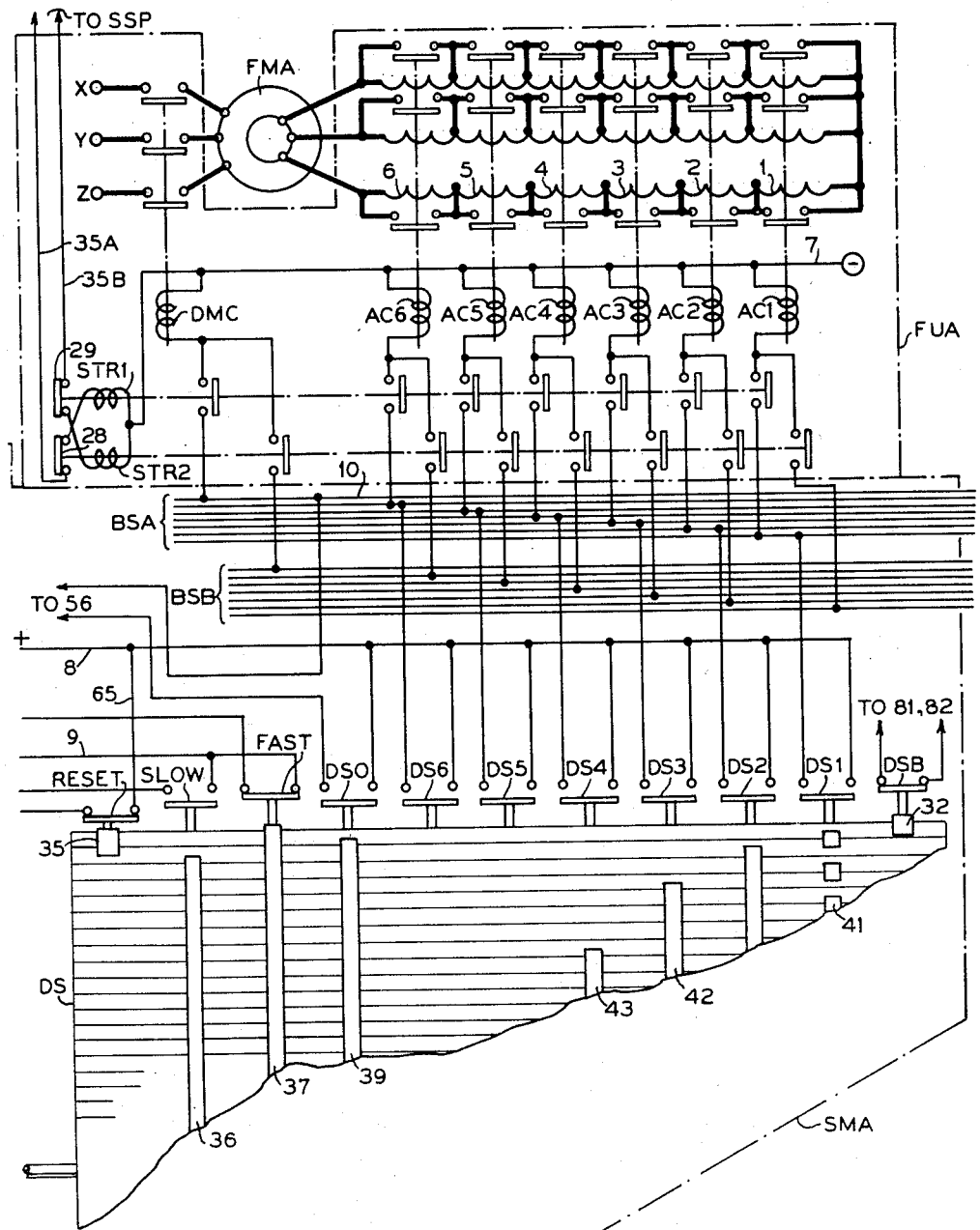
Fig. 11 is a circuit diagram of alternatively available modifications and may be substituted for Fig. 3 in the above-mentioned series of Figs. 1 to 5 to show a complete installation.

In the control system so far described, the drum switch DS in the master controller controls the contactors DMC and AC1 to AC6 of the individual unit controllers by the intermediary operation of respective contactors MR and MA1 to MA6 located in the master controller as shown in Fig. 3 for master controller SMA. If desired, however, and in accordance with a preferred embodiment, the drum-switch contacts may directly control the contactors in the individual unit controllers so that the contactors MR and MA1 to MA6 are eliminated. Such a modified design is illustrated in Fig. 11 which shows an alternative for the component illustrated in Fig. 3. That is, the sheet containing Fig. 11 may be inserted between the sheets showing Figs. 2 and 4 respectively, so that the components in Fig. 11 form part of the entire system then represented by the continuous sequence of Figs. 1, 2, 11, 4, 5. It will be recognized that according to Fig. 11 the drum-switch contacts DS1 to DS6 as well as the drum-switch contact DS0 are directly connected with the individual busses of the manifold bus BSA and are also individually connected with the contactors AC1 to AC6 and DMC in all unit controllers that, at any time, are selected for cooperation with master controller SMA in system A.

According to Fig. 3, as described above, the unit controller FUA for folder A is permanently connected with master controller SMA and for that reason does not comprise the system transfer relays STR1 and STR2 with which each press-unit control is equipped. Similarly, the controller FUB for folder B is permanently connected with master controller SMB. However, according to another modification, also representing a preferred embodiment of the invention, each folder control unit is likewise provided with a pair of system transfer relays STR1 and STR2 so that the folder can be selectively connected with any one of the available master controllers. This is likewise illustrated in Fig. 11.

It will be recognized from Fig. 11 that according to this embodiment the folder control unit FUA has its contactors DMC and AC1 to AC6 selectively connected either with the manifold bus BSA or the manifold bus BSB depending upon whether the system transfer relay STR1 or STR2 in unit FUA is energized at a time through the control lead 35A or 35B. This requires that the system selector SST (Fig. 1) be supplemented by a system transfer panel to which the leads 35A and 35B are connected and which is associated with the folder control unit FUA.

The other folder control units of the plant, such as the unit FUB, are likewise designed as shown in Fig. 11 for unit FUA and are likewise associated with an individual selector panel in the system selector SSP. The additional selector panels for the folder control units are identical in design and equipment with the selector panel SP1 as shown in Fig. 1.

In such a system each folder can be grouped, as desired, into system A or system B. For example, in the shaft alignment diagram at the bottom of Fig. 1, the unit drives UM6 and UM5 as well as the folder drive FMA may be grouped together with any one of several of unit drives UM1, UM2, UM3, UM4 for operation with folder drive FMB. In this manner, for example, the press-units driven by drives UM6 and UM5 may operate on a web of paper which is ultimately cut and folded in folder B, the folder A running idle and being by-passed by the web. In a similar way any printing press units located in the diagram at the left of folder drive FMB can be made to cooperate in system A together with the folder driven by unit drive FMA. As a result the versatility of available system selections is greatly increased; and it will also be apparent that in the modified system just described all unit controllers, including those for the folders, are exactly identical and interchangeable or replaceable by a spare unit of a single standard design.

Another alternative applicable in any of the embodiments described above relates to the manner and location of the system selector devices. While according to the embodiments so far described, the system make-up is selected by operation of the switch SSW in each selector panel of the system selector SSP (Fig. 1), the selection may also be made automatically simply by properly setting the clutches CL of the line shaft assembly. In this case it is only necessary to eliminate the switches SSW from the respective selector panels. That is, the circuits described above as being controlled by contacts 92, 93, 96, 97 are kept permanently closed, and the circuits controlled by contacts 94 and 95 are omitted in the system selector. Since no other change is necessary, the just-mentioned alternative is not further illustrated.

*Modular design and plug-in connections*

By virtue of the fact that a drive system according to the invention is composed of groups of subassemblies or units that are identical within each group and are connected with the other subassemblies and groups only by electric connections for power supply, selection intelligence and control intelligence, a system of this type is not only versatile as regards available possibilities of press make-up, future expansion and modification of an existing plant, but also affords giving such systems a modular design in conjunction with plug-in connections which greatly facilitates designing such a plant from stock components for a variety of particular requirements, reduces the amount of replacement components that must be kept in stock by the manufacturer as well as in the plant, and also facilitates any repair or exchange of system components in the event of trouble.

As mentioned above, the press unit controllers illustrated in Figs. 1 to 5 are all identical and each of them is housed within its own cabinet or cubicle. In the modified and preferred embodiment described with reference to Fig. 11, not only the press unit controllers but also the folder controllers are all identical. The master controllers have likewise the same interchangeable design and are each housed in its own cabinet or cubicle. Similarly, the various selector panels are identical, and the various push-button stations are likewise identical. The system, therefore, lends itself readily for the application of plug-in connections between the individual subassemblies or units so that each individual unit cubicle, station or panel can readily be inserted into, or removed from, the installation simply by disengaging one or more multiple-type plug connectors. This is illustrated in Fig. 12 for the press-unit controller UC1 as shown in Fig. 4, it being understood that a corresponding arrangement of plug connections is also employed for all other units or subassemblies of the entire installation.

Figure 12:
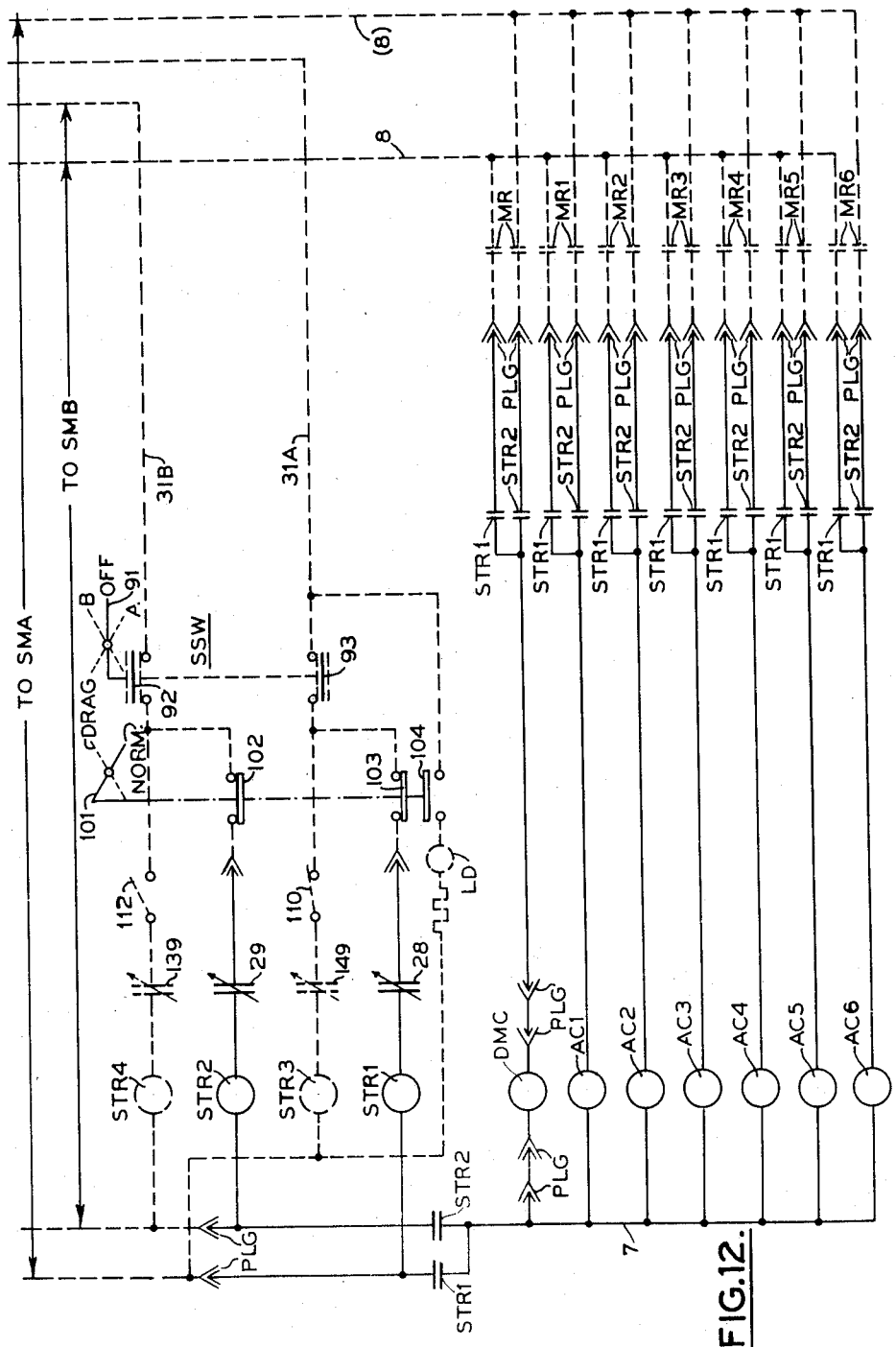
Fig. 12 is a wiring diagram of plug-in connections for the press unit controller shown in Fig. 4.

Fig. 12 is essentially a copy of a straight-line engineering drawing as customary in industry and for that reason shows electric symbols as customary in industrial drawings. The coils of contactors DMC and AC1 to AC6, as well as the coils of system transfer relays STR1, STR2, are represented by circles. The pairs of parallel lines denoted by STR1 and STR2 denote respective relay contacts in relay STR1 and STR2. A similar presentation is used for the contacts in relays MR and MA1 to MA6 which are located in master controller SMA according to Fig. 3. In Fig. 12, only the components that form part of the unit controller UC1 and are all located in the cubicle or cabinet of that unit controller are shown in full lines. The components and circuit leads shown in Fig. 12 by broken lines do not form part of unit controller UC1 but are located elsewhere and are illustrated to facilitate understanding the diagram and comparing it with Figs. 1 to 5.

Since, as far as all components of unit controller UC1 are concerned, the content of Fig. 12 is identical with that described above with reference to unit controller UC1 in Fig. 4, the description of these components need not here be repeated. However Fig. 12 additionally represents a multiplicity of plug-in connectors all denoted by PLG. One group of these connectors is located at the left of the illustration, and the other on the right-hand side. Each connector has a male and a female member as customary. The male members are all mounted on one or more insulating carriers (described below with reference to Figs. 14, 15) so that they are simultaneously engageable by the female members which are likewise mounted on such carriers.

Figure 13:
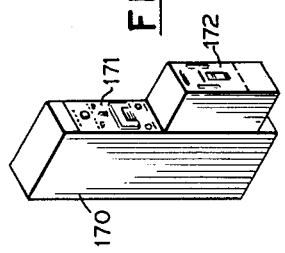
Fig. 13 is a schematic and perspective view of a cubicle for one of the unit controllers.

One of the cubicles is separately illustrated in Figs. 13 to 15 and will be described with reference to the press-unit controller UC1 according to Figs. 4 and 12, although, as mentioned, the cubicles for the other unit controllers, including those for the folder units, are similar.

The cubicle 170 (Fig. 13) comprises a steel frame construction with two sliding drawers 171 and 172 on which the unit control components are mounted. Located in the upper portion of the cubicle is a sheet-metal housing 174 (Fig. 15) which encloses the secondary resistor stack (1 to 6 in UC1, Fig. 4) of the unit drive motor and is supplied by a fan 175 with a forced flow of cooling air entering through an intake grille 176 and leaving through an exhaust duct 177. The acceleration control contactors AC1 to AC6, corresponding to those denoted by the same respective reference numerals in Figs. 4 and 12, are also mounted in the upper portion of the cubicle which also houses the system transfer relays STR1 and STR2. A wire trough 178 is provided in the top portion of the cubicle above the upper drawer, and a similar wire trough 179 is provided in the bottom portion beneath the lower drawer.

The front panel of the upper drawer 171 is provided with a no-voltage light 180 and with two system transfer lights LA1 and LB1 which, when lit, indicate whether the unit drive is connected in system A or system B respectively. These two lights correspond to the signal lamps LA and LB in selector panel SP1 (Fig. 1) and are controlled by operation of the system transfer relays STR1 and STR2 respectively. Further mounted on the front panel of the upper drawer are a circuit breaker 181 for the motor of fan 175, an access door 182 through which the fuses (not shown in the circuit diagram) for overload protection are accessible, a fan motor starter 183, and an ammeter 184. In the illustrated embodiment the front panel of the upper drawer 171 further carries a "drag" switch DSW1 and a system selector switch SSW1 which correspond to the respective switches DSW and SSW in system selector panel SP1 (Fig. 1) and are added to the unit controller so that, if desired, the system selection for the particular press unit can also be made at the unit controller. A number of fault-finder lights, not further described in this specification, are shown at 185 in Fig. 14.

Located in the lower drawer 172 are the motor primary contactor DMC, a circuit breaker 186 for overload protection of the drive motor, and a voltage relay 191 which responds to voltage failure and then lights the no-voltage light 180 and actuates one of the above-mentioned NVC contacts that cause the drive to be stopped.

It will be recognized that each unit controller provides complete control and visual indication of the functioning of the appertaining unit drive.

The above-mentioned plug-connector carriers are denoted in Figs. 14 and 15 by 188 and 189. Connectors 188 in the lower portion of the cubicle serve to connect and disconnect the primary power circuit of the unit drive motor with the contacts of primary contactor DMC (see Fig. 4). Six connectors 189 are provided for the control connections of the unit including those shown in Fig. 12 at PLG. In Fig. 15 the member of each connector shown on the right-hand side is mounted on the frame structure of the cubicle, whereas the left-hand member of each connector is mounted on the drawer. Consequently by simply removing the drawer, the appertaining plug connections are automatically opened, and by inserting the drawer fully into the cubicle these connections are closed. It is thus possible, in the event of trouble, to remove each individual drawer subassembly and to substitute a spare drawer, thus reducing maintenance requirements and stoppage periods to a minimum.

While in the preferred embodiments of our invention, as described in the foregoing, two or more master controllers are available for selectively connecting the desired number and grouping of unit drives to any one of these master controllers, various aspects and advantages of our invention can also be embodied in a plant which is equipped, or initially equipped, with only one master controller so that, by virtue of the system selector means and transfer relays, any desired number of unit drives in any desired grouping can be connected to the master controller.

It will further be understood that, while we have preferred providing the illustrated embodiments with a motor-driven drum switch in each master controller, the invention is analogously applicable with other sequencing or switching means such as an electromagnetic stepping switch, a tree-connection of electromagnetic relays, a switching device composed of electronic tubes or transistors, or any other stepping device capable of bi-directional operation to progressively vary the resistance in the secondary circuits of the unit-drive motors simultaneously controlled by the sequencing means of the master controller. Therefore, the term "reversible sequencing switch" in the annexed claims is meant to comprise any such bi-directional sequencing devices.

It will further be obvious that a large number of other details are susceptible to modification and alteration without departing from the essential features of the invention and within the scope of the claims annexed hereto. For instance, the number of six resistance steps for the individual unit controllers is arbitrary, as any larger or smaller number may be chosen; and it is further not essential to the invention whether the progressive and incremental change in resistance follows a geometric or any other desired progression.

We claim:

1. A multi-motor speed control system, comprising wound-rotor induction motors each having a primary alternating-current circuit and a secondary resistance circuit; a primary contactor in each of said respective primary circuits for controlling the current supply to said respective motors; a group of secondary contactors connected with each of said respective secondary circuits for controlling its resistance; a plurality of master controllers each having a reversible sequencing switch; groups of system selector relays, said groups being correlated to said respective motors, the relays of each individual group being selectively actuable and each relay, when active, connecting said contactors of one of said respective motors with a selected one of said sequencing switches whereby all motors simultaneously connected by said relays to said one sequencing switch are jointly controlled thereby; and system selector means having individually operable selector switches connected with said respective groups of relays for actuating one selected relay of each group at a time.

2. A multi-motor speed control system, comprising a number of drive motors each having current supply means and a speed-controlling resistance circuit; a group of contactors connected with each of said respective resistance circuits for controlling its resistance; a plurality of master controllers each having a reversible sequencing switch; groups of system selector relays correlated to said respective motors, the relays of each individual group being selectively actuable and each relay, when active, connecting said contactors of one of said respective motors with one of said respective sequencing switches whereby all motors simultaneously connected by said relays to said one sequencing switch are jointly controlled thereby; system selector means having a number of individually operable selector switches connected with said respective groups of relays for selectively actuating one relay of each group at a time; a number of mutually spaced control means correlated to said respective motors for controlling said sequencing switches; selectively actuable signal transfer relays each connecting, when active, said control means to one of said respective master controllers; and means connecting said signal transfer relays to said system selector means in correlation to said system transfer relays, whereby the control means for each motor are active upon the one selected master controller whose sequencing switch controls the same motor.

3. A multi-motor speed control system, comprising a number of wound-rotor induction motors each having alternating-current supply means and a secondary resistance circuit; a group of contactors connected with each of said respective secondary circuits for controlling its resistance; a plurality of master controllers each having a sequencing switch incrementally movable in forward and reverse directions; groups of system selector relays correlated to said respective motors, the relays of each individual group being selectively actuable and each relay, when active, connecting said contactors of one of said respective motors with one of said respective sequencing switches whereby all motors simultaneously connected by said relays to said one sequencing switch are jointly controlled thereby; system selector means having a number of individually operable selector switches connected with said respective groups of relays for selectively actuating one relay of each group at a time; each of said master controllers having a reversible drive connected with said sequencing switch for operating the latter; control means connected with said drive in each of said master controllers for selectively operating said sequencing switch in said forward and reverse directions respectively; a number of push-button switch stations correlated to said respective motors; selectively actuable signal transfer relays each connecting, when active, said stations to one of said respective master controllers; and means connecting said signal transfer relays to said system selector means in correlation to said transfer relays, whereby the push-button station for each motor is active upon the one selected master controller whose sequencing switch controls the same motor.

4. A multi-motor speed control system, comprising a number of wound-rotor induction motors each having alternating-current supply means and a secondary resistance circuit; a group of contactors connected with each of said respective secondary circuits for varying the resistance of said circuit to control the motor speed; a plurality of master controllers each having reversible sequencing switch means; groups of control contacts for controlling said sequencing switch means, said groups being mounted at different respective localities in correlation to said respective motors; respective transfer relay means for each of said motors, said relay means connecting said group of contactors of said motor, as well as the one group of control contacts correlated to the said motor, with a selected one of said master controllers at a time; and respective system selector means for said motors, said selector means being connected with said transfer relay means for selectively controlling the latter.

5. An alternating-current drive for a printing plant having folders and having press units operable in selected number together with a selected folder, which comprises a wound-rotor motor for each of said folders and press units respectively, each motor having primary terminals and secondary terminals; an individual unit controller for each of said respective motors, each unit controller having a primary contactor connected with said primary terminals, resistors connected with said secondary terminals, and contactors connected with said resistors for controlling the motor speed; a plurality of master controllers equal in number to said folders, each master controller having electric sequencing switch means; and selectively operable transfer relay means connecting said contactors of each individual unit controller with a selected one of said master controllers, whereby any one of said folders can be grouped together with a selected one of said master controllers and with a selected number of said press units for simultaneous and correlated speed control by said sequencing switch means of said selected master controller.

6. An alternating-current multi-motor drive for a printing plant having folder units and press units, comprising folder drive motors and press drive motors all of the wound-rotor type each having primary terminals and secondary terminals, said press drive motors having respective aligned drive shafts mechanically connectable with said respective folder drive motors in a selected number and grouping; each of said motors having an individual control unit comprising a primary contactor connected to said primary terminals for controlling the supply of power thereto, a resistor circuit connected to said secondary terminals, and acceleration contactors connected with said resistor circuit for varying its resistance to control the motor speed; a plurality of master controllers equal in number to said folder drive motors; each of said master controllers having reversible sequencing switch means for controlling said contactor; groups of control means for controlling the sequencing switch means, each group being correlated to one of said respective folder units and press units; and selectively operable transfer means connecting said contactors in each of said control units and the associated one of said control-means groups with a selected one of said master control units at a time.

7. An alternating-current drive for a printing plant having folder units and press units, comprising folder drive motors and press drive motors all of the wound-rotor type each having primary terminals and secondary terminals and each having a drive shaft aligned with the drive shafts of the other motors; a clutch disposed between each two adjacent shafts for interconnecting said shafts to permit joining a selected number of said press units with a selected folder unit; an electric switch connected with each clutch and controlled thereby in dependence upon open and closed setting of the clutch; each of said motors having an individual control unit comprising a primary contactor connected to said primary terminals for controlling the supply of power thereto, a resistor circuit connected to said secondary terminals, and acceleration contactors connected with said resistor circuit for varying its resistance to control the motor speed; a plurality of master controllers equal in number to said folder drive motors, each of said master controllers having reversible sequencing switch means for controlling said contactors; groups of control means for controlling the sequencing switch means, each group being correlated to one of said respective folder units and press units; transfer relay means connecting said contactors in each of said control units and the associated one of said groups of control means with a selected one of said master control units, and electric circuit means connecting said transfer relay means with said clutch-controlled switches for making the selection of said one master controller relative to each press drive motor electrically dependent upon mechanical shaft connection of said press drive motors with the drive shaft of a given one of said folder units.

8. An alternating-current drive for a printing plant having folder units and press units, comprising folder drive motors and press drive motors each having a drive shaft aligned with the drive shafts of the other motors; a clutch disposed between each two adjacent shafts for interconnecting said shafts to permit joining a selected number of said press units with a selected folder unit; an electric switch connected with each clutch and controlled thereby in dependence upon open and closed setting of the clutch; unit controllers equal in number to said motors and each having speed-control means connected with one of said respective motors; master controllers equal in number to said folder units and each having a speed sequencing switch and a reversible drive connected therewith; groups of control means for controlling said switch drive, said groups being located at said folder units and press units respectively; selectively operable transfer relay means for each unit controller connecting said unit controller as well as the one correlated group of said control means with a selected one of said master controllers; a system selector having a number of selectively operable selector switches for controlling said transfer relay means; and a circuit connecting each of said respective selector switches with said transfer relay means for said respective unit controllers, said circuit being also connected with said clutch switches and controlled thereby to permit operating said transfer relay means in dependence upon corresponding of said clutches.

9. An alternating-current drive for a printing plant having folder units and press units, comprising folder drive motors and press drive motors all of the wound-rotor type each having primary terminals and secondary terminals; a unit controller for each of said respective motors, each unit controller having a primary contactor connected with said primary terminals for controlling the power supply thereto and having resistors connected with said secondary terminals, and a group secondary contactors connected with said resistors for controlling them to change the motor speed; a master controller for each of said respective folder units, said master controller having a sequencing switch connected with said contactors of said folder-motor unit controller; each of said press-motor unit controllers having selectively actuable transfer relays connecting said contactors of said press-motor unit controller with said sequencing switch of a selected one of said master controllers whereby all press-unit motors simultaneously connected to said one master controller are jointly speed controlled by said sequencing switch of said one master controller; groups of control means for controlling said sequencing switches of said master controllers, said groups being located at said press units respectively; signal transfer relays connecting each group of control means with said one selected master controller; system selector means having a selector switch for each of said respective press-motor control units; and means connecting said selector switches with said system transfer relays and signal transfer relays for joint control of both.

10. An alternating-current multi-motor drive for a printing plant having folder units and press units, comprising folder drive motors and press drive motors having power supply terminals and a speed-controlling resistor circuit, said press drive motors having respective aligned drive shafts mechanically connectable with said respective folder drive motors in selected number and grouping; a unit controller for each of said respective motors, each unit controller comprising a main contactor connected to said terminals for controlling the supply of power thereto, and speed-control contactors connected with said resistor circuit for varying its resistance to control the motor speed; a plurality of master controllers equal in number to said folder drive motors, each of said master controllers comprising a reversible sequencing switch having switch contacts for controlling said main and control contactors respectively and having a reversible switch drive and control means therefor; a manifold bus extending from said switch contacts of each master controller to said respective unit controllers; circuit means connecting said folder-motor unit controllers with the manifold bus coming from one of said respective master controllers; each of said press-motor unit controllers having system transfer relays selectively actuable to connect said contactors of said press-motor unit controller with a selected one of said respective manifold busses; a group of control means for each of said folder and press units, each group having manually actuable control contacts and condition responsive contacts for controlling said master controllers; selectively operable signal transfer relays for each of said press units, said signal transfer relays connecting said group of control means for said press unit drive with said switch-drive control means in the one of said respective master controllers to whose manifold bus the unit controller of said press unit is simultaneously connected by said system transfer relays; and system selector means comprising for each of said press unit controllers a selector switch connected with said system transfer relays and signal transfer relays for selective control of both.

11. In a multi-motor printing-press drive according to claim 10, said switch-drive control means in each of said master controllers comprising two reversing contactors connected with said reversible switch drive for actuating said drive in opposite directions respectively; a stop relay having an energizing circuit, said sequencing switch having another switch contact closed only in the off position of said switch, said circuit extending through said other switch contacts so that said stop relay picks up only when said sequencing switch is in off position, said stop relay having a self-holding circuit for remaining picked up when said sequencing switch moves away from the off position, said self-holding circuit having control contacts forming part of said respective group of control means for causing said stop relay to drop out, said stop relay having respective further contacts connecting each of said reversing contactors, only when said stop relay is picked up, with other control contacts which also form part of said respective groups of control means.

12. In a multi-motor printing-press drive according to claim 11, said stop relay having a normally open contact interposed between said sequencing switch and said respective primary contactors of said folder unit controller and said press unit controllers simultaneously connected to said master controller whereby said latter stop-relay contact causes stopping of the drive when said stop relay drops out.

13. In a multi-motor printing-press drive according to claim 12, said stop relay having a normally closed further contact connected with the one of said reversing contactors that, when energized, causes said switch drive to return said sequencing switch to the off position; said sequencing switch having a further switch contact open only in the off position of said sequencing switch and connected in series with said one reversing contactor and in series with said further stop-relay contact, whereby said stop relay, when dropping out, causes said sequencing switch to return to its off position.

14. An alternating-current drive for a printing plant having folder units and press units, comprising folder drive motors and press drive motors all of the wound-rotor type each having primary terminals and secondary terminals and each having a drive shaft aligned with the drive shafts of the other motors; a clutch disposed between each two adjacent shafts for interconnecting said shafts to permit joining a selected number of said press units with a selected folder unit; an electric switch connected with each clutch and controlled thereby in dependance upon open and closed setting of the clutch; each of said motors having an individual control unit comprising a primary contactor connected to said primary terminals for controlling the supply of power thereto, a resistor circuit connected to said secondary terminals, and acceleration contactors connected with said resistor circuit for varying its resistance to control the motor speed; a plurality of master controllers equal in number to said folder drive motors, each of said master controllers having reversible sequencing switch means for controlling said contactors; groups of control means for controlling the sequencing switch means, each group being correlated to one of said respective folder units and press units; transfer relay means connecting said contactors in each of said control units and the associated one of said groups of control means with a selected one of said master control units; a system selector comprising an individual selector unit for each of said press-drive control units, said selector unit having a system selector switch and a normally closed drag switch; signal circuits extending serially through one of said clutch switches and said drag switch and said selector switch of each of said respective selector units to said transfer relay means of one of said respective press-drive control units for selectively controlling said transfer relay means in dependence upon the selected position of said selector switch; each of said signal circuits being interrupted when said drag switch is in open position whereby the motor connected to said one unit controller remains deenergized during press run.

15. In a multi-motor printing press drive according to claim 14, said transfer relay means comprising in each press-drive control unit a group of system transfer relays for connecting said contactors of said unit to a selected master controller, and separate signal transfer relays outside of said press drive control unit for connecting said groups of control means with the same selected master controller; and each of said selector units of said system selector having another switch normally closed; and further signal circuits each extending from said signal transfer relays through said latter switch and through one of said clutch switches whereby said group of control means is in operative condition in dependence upon the selected clutching of the drive shaft of the correlated press drive motor and in dependence upon said other switch of said selector unit.

16. An alternating-current drive for a printing plant having folder units and press units, comprising folder drive motors and press drive motors all of the wound-rotor type each having primary terminals and secondary terminals and each having a drive shaft aligned with the drive shafts of the other motors, a clutch disposed between said two adjacent shafts for interconnecting said shafts to permit joining a selected number of said press units with a selected folder unit; an electric switch connected with each clutch and controlled thereby in dependence upon open and closed setting of the clutch; each of said motors having an individual control unit comprising a primary contactor connected to said primary terminals for controlling the supply of power thereto, a resistor circuit connected to said secondary terminals, and acceleration contactors connected with said resistor circuit for varying its resistance to control the motor speed; a plurality of master controllers equal in number to said folder drive motors, each of said master controllers having reversible sequencing switch means for controlling said contactors; groups of control means for controlling the sequencing switch means, each group being correlated to one of said folder units and press units respectively; selectively operable system transfer relays in each of said press-drive control units for connecting said contactors of said unit to a selected master controller, and selectively operable signal transfer relays outside said press-drive control unit, for connecting said group of control means with the same selected master controller; a system selector comprising an individual selector unit for each of said press-drive control units, said selector unit having a system selector switch and a normally closed additional switch; first signal circuits extending through said clutch switches and said selector switch of each of said respective selector units to said transfer relay means of one of said respective press-drive control units for selectively controlling said transfer relay means in dependence upon the selected position of said selector switch; second signal circuits extending through said clutch switches and said additional switch to said signal transfer relays whereby said group of control means is in operative condition in dependence upon the selected clutching of the drive shaft of the correlated press drive motor and in dependence upon said additional switch being closed in said selector unit.

17. A multi-motor printing press drive, comprising folder drive motors and press-unit drive motors having respective aligned drive shafts; clutch means between said two adjacent ones of said shafts for mechanically joining with each folder drive motor a selected number and group of press-unit drive motors; speed control units individually connected with said respective motors; master control units equal in number to said folder drive motors, each master control unit having sequencing switch means for controlling said speed control units; a group of control contacts for each of said drive motors; first selective control means connecting each of said press-drive control units with the one master controller for the folder whose drive shaft is clutched together with the press drive shaft to which said control unit is correlated; second selective control means connecting each of said groups of control contacts with the sequencing switch means of said one master controller; a first selector switch for each of said respective press drive motors, said selector switch being connected with said first control means for selectively disconnecting the control unit of said press-drive motor from said latter motor to make said motor run deenergized within the selected group of clutched-together motors; and a second selector switch for each of said press drive motors, said selector switch being connected with said second control means for selectively disconnecting the group of control contacts from said master controller to make said contact group inactive during press run.

18. A multi-motor printing press drive, comprising folder drive motors and press-unit drive motors having respective aligned drive shafts; clutch means between said two adjacent ones of said shafts for mechanically joining with each folder drive motor a selected number and group of press-unit drive motors; speed control units individually connected with said respective motors; master control units equal in number to said folder drive motors, each master control unit having sequencing switch means for controlling said speed control units; a group of control contacts for each of said drive motors; selective control means connecting each of said press-drive control units with the one master controller for the folder whose drive shaft is clutched together with the press drive shaft to which said control unit is correlated, said selective control means also connecting each of said groups of control contacts with the sequencing switch means of said one master controller; said speed control units comprising respective exchangeably similar cubicles separable from each other and comprising each a primary contactor, secondary resistors and acceleration contactors connected with said resistors; said master control units having respective cubicles exchangeably similar to each other and comprising said respective sequencing switch means, a reversible drive for said switch means, and drive control means connected with said reversible drive and controllable by said groups of control contacts.

19. In a multi-motor printing press drive according to claim 5, said unit controllers comprising respective similar cubicles separable from each other, each unit-controller cubicle comprising said primary contactor, said resistors, said acceleration contactors and a group of said transfer relay means; said master controllers having respective similar cubicles separable from each other and comprising said respective sequencing switch means, a reversible drive for said switch means, and drive control means connected with said reversible drive, said master controller cubicles being separable from said cubicles of said unit controllers; and plug connections electrically interconnecting all said cubicles.

20. In a multi-motor printing-press drive according to claim 10, each of said folder-drive unit controllers also comprising system transfer relays disposed between said contactors of said folder-drive unit controller and said manifold buses and connecting said contactors with a selected one of said busses at a time, all of said unit controllers being mutually exchangeable and individually separable from the rest of the specified equipment.

21. A multi-motor speed control system, comprising wound-rotor induction motors each having a secondary resistance circuit; a group of secondary contactors connected with each of said respective secondary circuits for controlling its resistance; a master controller having reversible sequencing means; system selector relays correlated to said respective motors, said relays being selectively actuable and each relay, when active, connecting said contactors of one of said respective motors with said sequencing means whereby all motors simultaneously connected by said relays to said sequencing means are jointly controlled thereby; and system selector means having individually operable selector switches remote from said motors and from said master controller and connected with said respective system selector relays for selectively actuating one of said relays at a time.

22. An alternating-current drive for a printing plant having a folder unit and press units, comprising a folder drive motor and press drive motors all of the wound-rotor type each having primary terminals and secondary terminals and each having a drive shaft aligned with the drive shafts of the other motors; a clutch disposed between each two adjacent shafts for interconnecting said shafts to permit joining a selected number and grouping of said press units with said folder unit; an electric switch connected with each clutch and controlled thereby in dependence upon open and closed setting of the clutch; each of said motors having an individual control unit comprising a primary contactor connected to said primary terminals for controlling the supply of power thereto, a resistor circuit connected to said secondary terminals, and acceleration contactors connected with said resistor circuit for varying its resistance to control the motor speed; a master controller having reversible sequencing switch means for controlling said contactors; groups of external control means for controlling the sequencing switch means, each group being correlated to one of said respective units; selectively operable transfer relay means connecting, when selected for operation, said contactors in each of said press-drive control units and the associated one of said groups of control means with said master controller, and electric circuit means connecting said transfer relay means with said clutch-controlled switches for making the selective operation of the transfer relay means for each press drive motor electrically dependent upon mechanical shaft connection of said press drive motor with the drive shaft of said folder unit.

23. An alternating-current multi-motor drive for a printing plant having a folder unit and press units, comprising a folder drive motor and press drive motors all of the wound-rotor type each having primary terminals and secondary terminals, said press drive motors having respective aligned drive shafts mechanically connectable with said respective folder drive motor in selected number and grouping; a unit controller for each of said respective motors, each unit controller comprising a primary contactor connected to said primary terminals for controlling the supply of power thereto, a resistor circuit connected to said secondary terminals, and acceleration contactors connected with said resistor circuit for varying its resistance to control the motor speed; a master controller comprising a reversible sequencing means for controlling said primary and secondary contactors and internal control means for said sequencing means; a manifold bus extending from said sequencing means of said master controller to said respective unit controllers; circuit means connecting said folder-motor unit controllers with the manifold bus coming from said master controller; each of said press-motor unit controllers having system transfer relays selectively actuable to connect said contactors of said press-motor unit controller with said manifold bus; a group of external control means for each of said folder and press units, each group having manually actuable control contacts and condition responsive contacts for controlling said master controller; selectively operable signal transfer relays for each of said press units, said signal transfer relays connecting said group of external control means for said press unit drive with said internal control means in said master controller; and system selector means comprising for each of said press unit controllers a selector switch connected with said system transfer relays and signal transfer relays for selective control of both.

24. An alternating-current drive for a printing plant having a folder unit and press units, comprising a folder drive motor and press drive motors all of the wound-rotor type each having primary terminals and secondary terminals and each having a drive shaft aligned with the drive shafts of the other motors; a clutch disposed between each two adjacent shafts for interconnecting said shafts to permit joining a selected number of said press units with said folder unit; an electric switch connected with each clutch and controlled thereby in dependence upon open and closed setting of the clutch; each of said motors having an individual control unit comprising a primary contactor connected to said primary terminals for controlling the supply of power thereto, a resistor circuit connected to said secondary terminals, and acceleration contactors connected with said resistor circuit for varying its resistance to control the motor speed; a master controller having reversible sequencing switch means for controlling said contactors; groups of external control means for controlling the sequencing switch means, each group being correlated to one of said respective folder units and press units; transfer relay means connecting when actuated said contactors in each of said control units and the associated one of said groups of control means with said master controller; a system selector comprising an individual selector unit for each of said press-drive control units, said selector unit having a system selector switch and a normally closed drag switch; signal circuits extending serially through one of said clutch switches and said drag switch and said selector switch of each of said respective selector units to said transfer relay means of one of said respective press-drive control units for selectively actuating said transfer relay means in dependence upon the selected position of said selector switch; each of said signal circuits being interrupted when said drag switch is in open position whereby the motor connected to said one unit controller remains deenergized during press run.

25. In a multi-motor printing press drive according to claim 24, said transfer relay means comprising in each press-drive control unit a group of system transfer relays for connecting said contactors of said unit to said master controller, and separate signal transfer relays outside of said press-drive control unit for connecting said groups of control means with said master controller; each of said selector units of said system selector having another switch normally closed; and further signal circuits each extending from said signal transfer relays through said latter switch and through one of said clutch switches whereby said group of control means is in operative condition in dependence upon the selected clutching of the drive shaft of the correlated press drive motor and in dependence upon said other switch of said selector unit.

26. In a multi-motor printing press drive according to claim 22, said control units comprising respective similar cubicles separable from each other; said master controller units having a cubicle comprising said sequencing switch means and internal control means for controlling said sequencing switch means, said internal control means being controllable by said external control means; said master-controller cubicle being separable as a unit from said control units and from said external control means; and plug-in connections joining said cubicles and external control means with one another.

27. Drive control apparatus for use in a printing-press line wherein a plurality of press units each has an individual motor arranged to be selectively interconnected by respective clutch means with any one of a plurality of folder motors and wherein a circuit individual to each press unit motor and to each of said folder motors is partially extended responsive to the inter-connection of the respective clutch means; the improvement comprising means individual to each motor for varying the speed of said each motor, means individual to each folder for controlling said speed means, and switches each individual to respective one of said press unit motors and said folder motors for completing individual ones of said partially extended circuits to enable the control means of each folder motor to control the speed means of the press unit motor or motors with which it is interconnected.

28. Drive control apparatus for use with a plurality of press units each having a drive motor, a plurality of folders each having a drive motor and mechanical control means selectively operable to interconnect any two or more of said motors for transferring motion therebetween, the improvement comprising motor speed control apparatus individual to each motor, a sequence control switch individual to each folder, a plurality of other switches each individual to one press unit motor and to one folder motor, and a circuit controlled responsive to the interconnection of one of said press unit motors with one of said folder motors and operation of the other switch individual to said connected press unit motor and said one folder motor, said controlled circuit enabling the sequence switch individual to said one folder motor to control the motor speed apparatus of said connected press unit motor in synchronism with said one folder motor.

29. A printing-press line comprising a plurality of press units each having an individual motor, a plurality of folders each having an individual motor, clutch means for connecting any one of said folder motors with one or more of said press unit motors to transfer mechanical motion therebetween and for controlling a circuit individual to each connected press unit motor and folder motor, means individual to each motor for varying the speed of said each motor, means individual to each folder for controlling said speed means, and switches individual to respective ones of said press unit motors and said folder motors for rendering individual ones of the controlled circuits effective to enable the control means of each folder motor to control the speed means of the press unit motor with which it is interconnected.

References Cited in the file of this patent

UNITED STATES PATENTS

| 1,734,077 | Cline | Nov. 5, 1929 |
|---|---|---|
| 1,825,403 | Jungblut | Sept. 29, 1931 |
| 1,857,818 | McCleary | May 10, 1932 |
| 1,912,411 | Stansbury | June 6, 1933 |
| 2,182,631 | Kenyon | Dec. 5, 1939 |
| 2,403,101 | Lear | July 2, 1946 |
| 2,527,565 | Miller | Oct. 31, 1950 |